(12) United States Patent
Mori

(10) Patent No.: US 11,963,011 B2
(45) Date of Patent: Apr. 16, 2024

(54) RELAY ATTACK DETERMINATION DEVICE

(71) Applicant: Marelli Corporation, Saitama (JP)

(72) Inventor: Yuki Mori, Saitama (JP)

(73) Assignee: Marelli Corporation, Saitama (JP)

( * ) Notice: Subject to any disclaimer, the term of this patent is extended or adjusted under 35 U.S.C. 154(b) by 318 days.

(21) Appl. No.: 17/620,814

(22) PCT Filed: Oct. 14, 2020

(86) PCT No.: PCT/JP2020/038722
§ 371 (c)(1),
(2) Date: Dec. 20, 2021

(87) PCT Pub. No.: WO2021/111740
PCT Pub. Date: Jun. 10, 2021

(65) Prior Publication Data
US 2022/0417752 A1 Dec. 29, 2022

(30) Foreign Application Priority Data

Dec. 6, 2019 (JP) .................................. 2019-221121

(51) Int. Cl.
*H04W 12/122* (2021.01)
*H04B 17/318* (2015.01)
*H04W 24/10* (2009.01)

(52) U.S. Cl.
CPC ........ *H04W 12/122* (2021.01); *H04B 17/318* (2015.01); *H04W 24/10* (2013.01)

(58) Field of Classification Search
CPC .. H04W 12/122; H04W 24/10; H04B 17/318; H04B 1/3827; H04B 1/59; B60R 25/24; E05B 49/00; H04Q 9/00; G01S 11/06

USPC .......................................................... 726/22
See application file for complete search history.

(56) References Cited

U.S. PATENT DOCUMENTS 9,800,610 B1 * 10/2017 Lu ...................... H04W 12/128
10,440,576 B1 * 10/2019 Casamassima ....... H04W 12/08
11,751,062 B1 * 9/2023 de Haas ................ H04W 12/50
455/411

(Continued)

FOREIGN PATENT DOCUMENTS

CN 113267769 A * 8/2021 ............. G01S 11/02
DE 102018117941 A1 * 1/2020 ............. B60R 25/00

(Continued)

*Primary Examiner* — Sargon N Nano
(74) *Attorney, Agent, or Firm* — Young Basile Hanlon & MacFarlane, P.C.

(57) ABSTRACT

A strength meter in a relay attack determination device is disposed on a portable device and measures a reception strength by a plurality of times in each of a request signal and a request signal received from an in-vehicle device. A comparator executes a comparative process of the request signal and the request signal by using average values of the reception strength measured by the strength meter. A variation calculator calculates variation in the reception strength measured by a plurality of times in the strength meter regarding the request signal. The comparator, in a case where the variation in the reception strength exceeds a threshold value indicating a communication failure in the request signal, determines the relay attack regardless of a result of the comparative process.

7 Claims, 18 Drawing Sheets

(56) References Cited

U.S. PATENT DOCUMENTS

| | | | |
|---|---|---|---|
| 2005/0136856 A1* | 6/2005 | Goldberg | H04B 7/0842 455/101 |
| 2014/0132391 A1* | 5/2014 | Eder | G07C 9/00309 340/5.21 |
| 2016/0117877 A1 | 4/2016 | Hamada et al. | |
| 2016/0202697 A1* | 7/2016 | Matsumoto | H04W 12/122 701/2 |
| 2016/0267735 A1* | 9/2016 | Hamada | G07C 9/00309 |
| 2017/0291579 A1* | 10/2017 | Miyazawa | H04B 17/318 |
| 2017/0327083 A1* | 11/2017 | Verkin | B60R 25/24 |
| 2018/0099643 A1* | 4/2018 | Golsch | G01S 13/765 |
| 2019/0176759 A1* | 6/2019 | Heinrich | B60R 25/245 |
| 2019/0219678 A1 | 7/2019 | Miyazawa | |
| 2020/0047715 A1* | 2/2020 | Park | B60R 25/245 |
| 2021/0345110 A1* | 11/2021 | Revadigar | H04L 63/0442 |

FOREIGN PATENT DOCUMENTS

| | | | | |
|---|---|---|---|---|
| DE | 112020004695 T5 * | 7/2022 | | B60R 25/245 |
| EP | 3605476 A1 * | 2/2020 | | B60R 25/24 |
| JP | 2006-342545 A | 12/2006 | | |
| JP | 2019-41348 A | 3/2019 | | |
| JP | 2019-83436 A | 5/2019 | | |
| JP | 2019-105026 A | 6/2019 | | |
| WO | 2018/070219 A1 | 4/2018 | | |
| WO | WO-2018127407 A1 * | 7/2018 | | G07C 9/00309 |
| WO | 2018/186075 A1 | 10/2018 | | |
| WO | 2019/193866 A1 | 10/2019 | | |

* cited by examiner

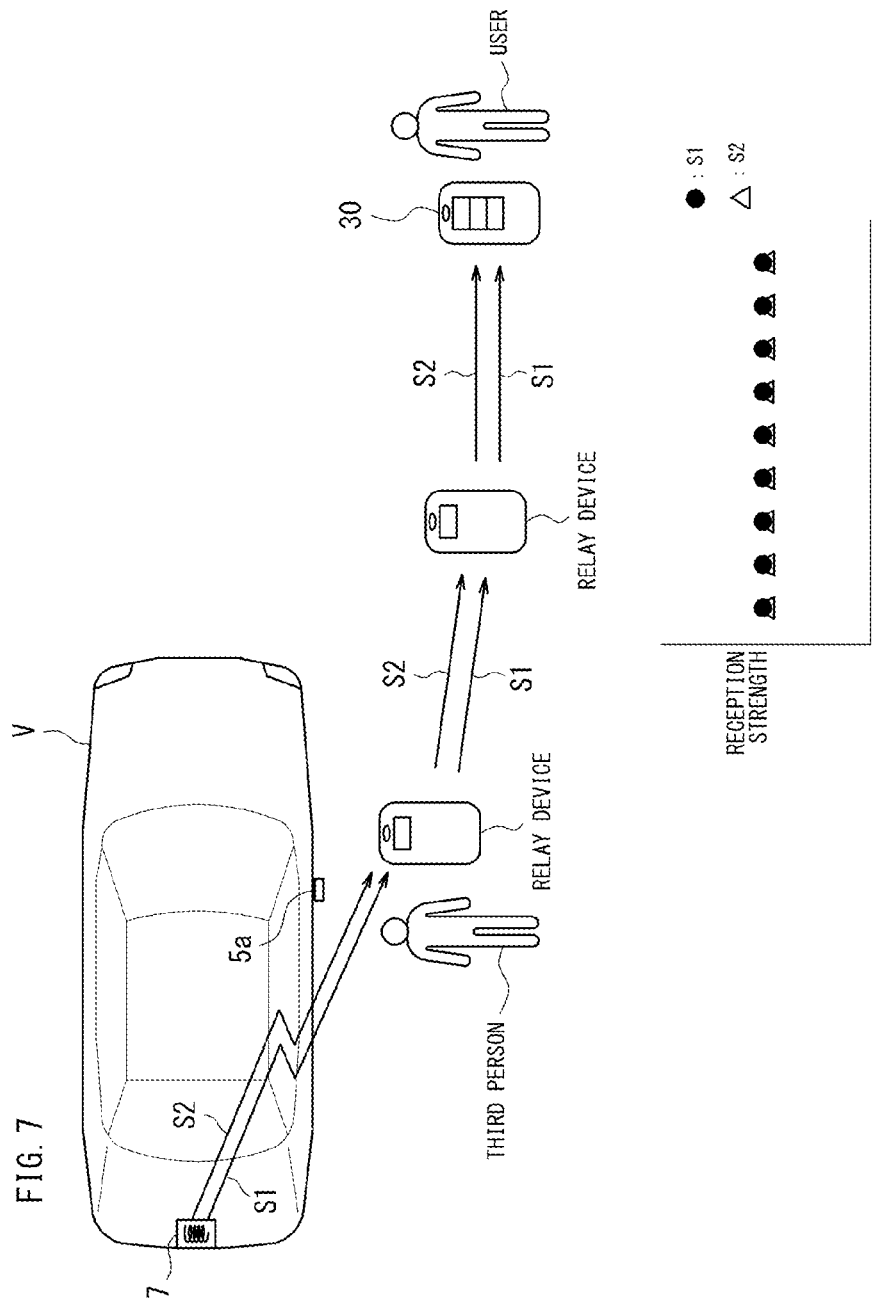

FIG. 10 <PORTABLE DEVICE>

FIG. 17 <MODIFICATION 3>
<PORTABLE DEVICE>

RELAY ATTACK DETERMINATION DEVICE

CROSS-REFERENCE TO RELATED APPLICATION

This application claims priority to and the benefit of Japanese Patent Application Serial No. 2019-221121, filed Dec. 6, 2019, the entire disclosure of which is hereby incorporated by reference.

TECHNICAL FIELD

The present invention relates to a relay attack determination device.

BACKGROUND ART

In a keyless entry system, wireless communications are carried out between an in-vehicle device and a portable device to control operations, such as locking and unlocking a door of a vehicle, performing start of an engine or the like.

For coping with a relay attack, for example, there is proposed a method in which two signals which differ in strength are transmitted from an in-vehicle device and the two signals received on a portable-device side are compared in strength (for example, refer to Patent Document 1). In a case where the portable device receives the signals directly from the in-vehicle device, the two signals differ in strength, but in a case where the signals are relayed by a relay device, since the two signals are identical in strength, it is possible to determine the relay attack.

CITATION LIST

Patent Document

Patent Document 1: Japanese Patent Laid-Open No. 2006-342545 A

SUMMARY

However, there is a possibility that a signal low in strength is intermittently relayed depending upon performance of a relay device. The strength is measured to a single signal by a plurality of times on the portable device and an average value of the measurement values is calculated for a comparative process. In a case where the signal low in strength is intermittently relayed, there possibly occurs variation in the measurement value in the measurements by the plurality of times. When an average value is calculated from the varied measurement values, the two signals differ in strength although the signals are relayed by the relay device, and the determination of the relay attack cannot be possibly made appropriately.

It is required to improve security in the keyless entry system by enhancing accuracy on the determination of the relay attack.

The present invention provides a relay attack determination device for determining a relay attack, in which wireless communications between an in-vehicle device and a portable device are relayed by a relay device, comprising:

a transmitter disposed on an in-vehicle device, the transmitter being configured to transmit a first signal and a second signal having an output condition different from an output condition in the first signal;

a receiver disposed on the portable device to receive the first signal and the second signal;

a strength meter disposed on the portable device to measure a reception strength by a plurality of times in each of the first signal and the second signal received by the receiver;

a comparator configured to execute a comparative process of the first signal and the second signal by using an average value in the reception strengths measured by the strength meter;

a determiner configured to determine the relay attack based upon a result of the comparative process; and a variation calculator configured to calculate variation in the reception strength measured by the plurality of times in the strength meter regarding a signal having lower reception strength between the first signal and the second signal, wherein in a case where the variation in the reception strength exceeds a threshold value indicating a communication failure, the determiner determines the relay attack regardless of the result of the comparative process.

According to the present invention, it is possible to improve the security and user's convenience in the keyless entry system by enhancing the accuracy on the determination of the relay attack.

BRIEF DESCRIPTION OF THE DRAWINGS

FIG. 7 is a diagram explaining a mechanism of the relay attack.

DETAILED DESCRIPTION

Figure 1:
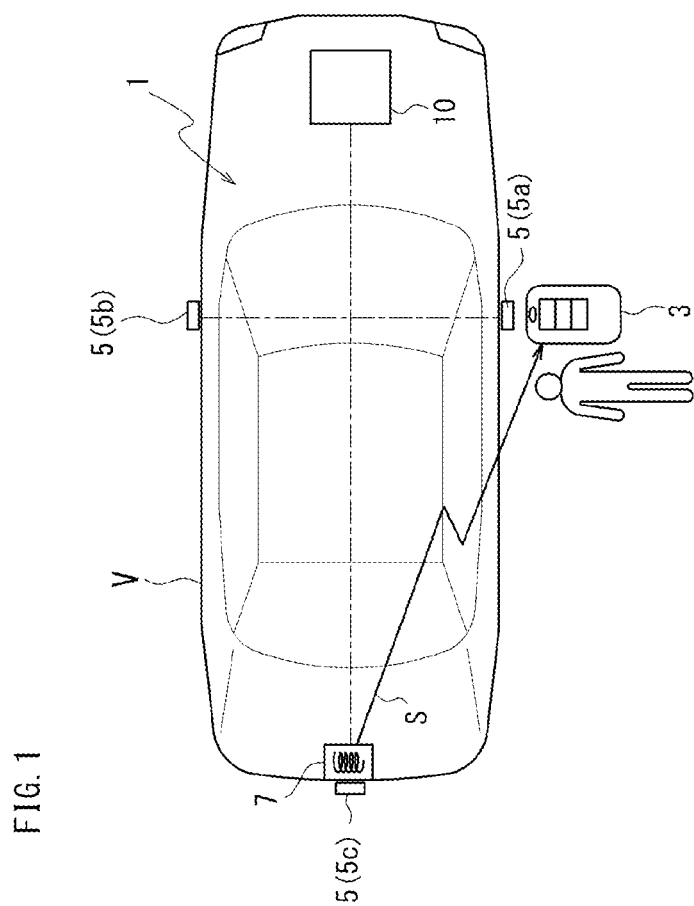
FIG. 1 is a schematic diagram of a relay attack determination device according to an embodiment of the present invention.

Hereinafter, an explanation will be made of an embodiment of the present invention by referring to the drawings.

FIG. 1 is a schematic diagram of a relay attack determination device according to an embodiment of the present invention.

As shown in FIG. 1, a keyless entry system includes an in-vehicle device 1 disposed in a vehicle V and a portable device 3 for a user of the vehicle V. The in-vehicle device 1 and the portable device 3 perform wireless communications to certify a correspondence relation between the in-vehicle device 1 and the portable device 3. The in-vehicle device 1 and the portable device 3 configure the keyless entry system and also configure the relay attack determination device which determines a relay attack to the vehicle V. The details of the relay attack will be described later.

The in-vehicle device 1 transmits a request signal S to the portable device 3, and the portable device 3 transmits an answer signal in response to the request signal S. The in-vehicle device 1 uses the answer signal to certify the correspondence relation between the vehicle V and the portable device 3, and performs control for lock or unlock of a door. The in-vehicle device 1 transmits the request signal S as an LF signal of 125-135 KHz, for example. The portable device 3 transmits, for example, a RF signal in a UHF band as the answer signal. It should be noted that a control target of the keyless entry system includes, not limited to the door lock but other in-vehicle equipment, such as an engine start or a steering lock, and a detailed explanation thereof is omitted. An explanation will be made of the control of the door lock, particularly of control of door unlock in the embodiment.

Figure 2:
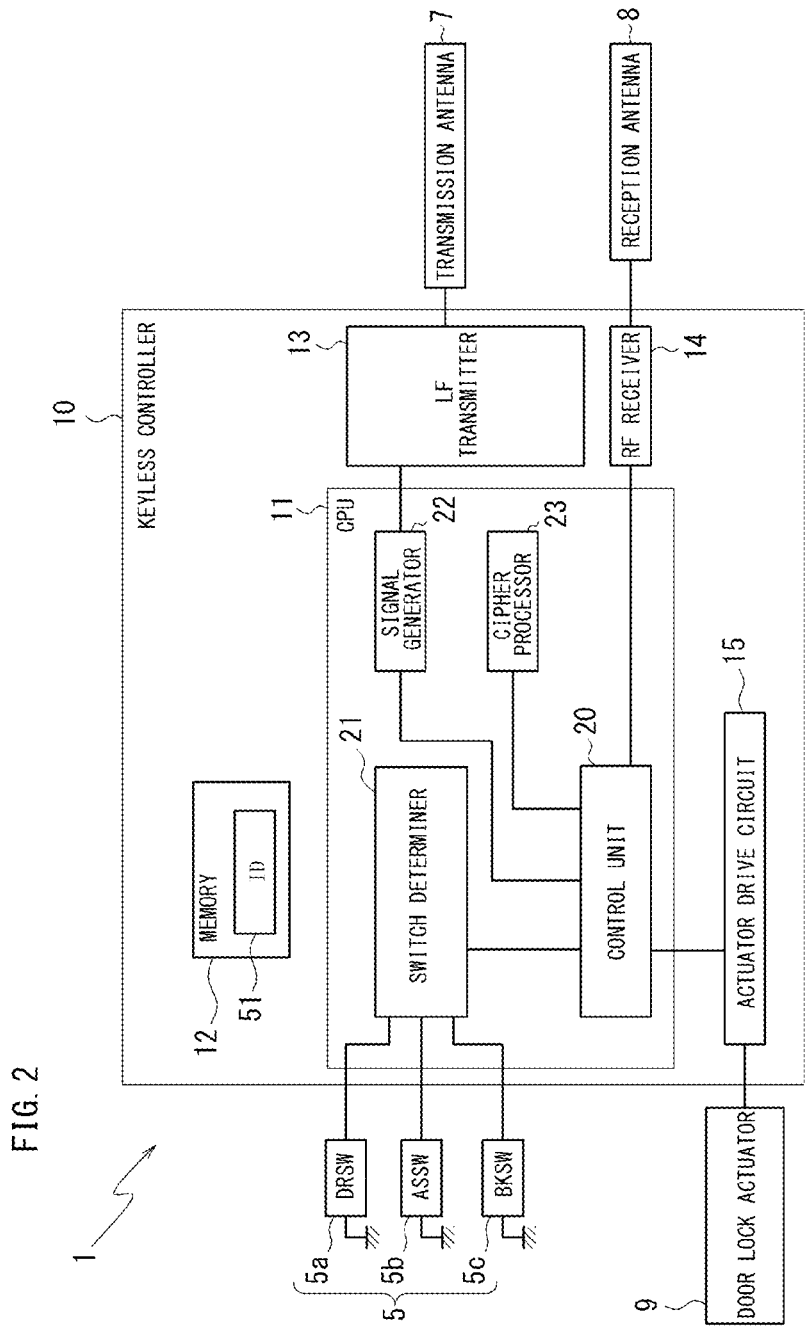
FIG. 2 is a block diagram showing the configuration of an in-vehicle device.

FIG. 2 is a block diagram showing the configuration of the in-vehicle device 1.

As shown in FIG. 2, the in-vehicle device 1 is provided with a request switch 5, a keyless controller 10, a transmission antenna 7, a reception antenna 8 and a door lock actuator 9.

The request switch 5 is installed in the door or the trunk of a vehicle body and accepts an unlock request of the door from a user. The request switch 5 is composed of, as shown in FIG. 1, request switches 5a, 5b, 5c installed respectively in a driver seat door, a front passenger seat door and the trunk, for example. The request switch 5 may be a switch button, for example. The switch button accepts the unlock request by performing an operation such as pushing or touching by a user.

The transmission antenna 7, when any of the request switches 5a, 5b, 5c is operated, transmits the request signal S as the LF signal. It should be noted that the transmission antenna 7 is disposed on the backward side of the vehicle V in an example in FIG. 1, but the position of the transmission antenna 7 is not particularly limited thereto but may be disposed on another position.

The reception antenna 8 receives the answer signal from the portable device 3. The answer signal is transmitted as a response signal to the request signal S by the portable device 3. The door lock actuator 9 unlocks and locks the driver seat door, the front passenger seat door and rear doors.

The keyless controller 10 is connected to the request switch 5, the transmission antenna 7, the reception antenna 8 and the door lock actuator 9 each. The keyless controller 10 generates the request signal S in response to an operation of the request switch 5 and allows the request signal S to be transmitted from the transmission antenna 7 to the portable device 3. The keyless controller 10 receives the answer signal via the reception antenna 8 in response to the request signal S for certification. The keyless controller 10 controls a drive of the door lock actuator 9 in response to a certification result of the answer signal to perform the unlock of the door.

The keyless controller 10 is provided with a CPU 11, an LF transmitter 13, a RF receiver 14, a memory 12 and an actuator drive circuit 15. The LF transmitter 13 is configured of a transmission circuit and the like, and is connected to the transmission antenna 7. The LF transmitter 13 executes a process for digital/analogue conversion or the like of the request signal S generated in the CPU 11, which is caused to be transmitted as an LF radio wave from the transmission antenna 7. The RF receiver 14 is configured of a reception circuit and the like, and is connected to the reception antenna 8. The RF receiver 14 receives the answer signal and executes a process for digital/analogue conversion or the like of the received answer signal. The actuator drive circuit 15 is a circuit for causing the door lock actuator 9 to be driven in response to input of the CPU 11.

The memory 12 stores therein control programs of the keyless controller 10 and information necessary for the process of the keyless controller 10. The memory 12 also temporarily stores therein various data generated in the process of the CPU 11. The memory 12 stores therein ID of the portable device 3 as an example.

As shown in FIG. 2, the CPU 11 is provided with a control unit 20, a switch determiner 21, a signal generator 22 and a cipher processor 23. The control unit 20 is provided with an unillustrated timer.

Not particularly described, but each part of the CPU 11 causes the process result to be temporarily stored in the memory 12, and reads out the necessary data and the process target from the memory 12 and resets the temporarily stored data after process completion.

The switch determiner 21 determines which of the request switches 5a, 5b, 5c is operated and inputs the determination result into the control unit 20.

The control unit 20 executes control for the entirety of the CPU 11. The control unit 20 generates a cipher C such as random numbers regarding the transmission of the request signal S. The control unit 20 inputs the generated cipher C together with a process command into the cipher processor 23. The control unit 20 also inputs the generated cipher C together with a signal generating command into the signal generator 22.

The cipher processor 23 executes a calculation process using the cipher C generated in the control unit 20 by a predetermined calculation process according to the process command of the control unit 20. The predetermined calculation process incorporates therein ID of the portable device 3 stored in the memory 12. The cipher processor 23 causes the process result to be stored as an in-vehicle device-side process result in the memory 12. This in-vehicle device-side process result is used at the time of receiving the answer signal from the portable device 3.

The signal generator 22 generates the request signal S according to the signal generating command of the control unit 20, and outputs the request signal S to the LF transmitter 13. The signal generator 22 controls the LF transmitter 13 to output the request signal S from the transmission antenna 7.

The LF transmitter 13 executes a process of the digital/analogue conversion or the like to the request signal S to be converted to an LF transmitting wave as an electromagnetic wave, and outputs the LF transmitting wave to the transmission antenna 7. The transmission antenna 7 forms a magnetic field therearound. The portable device 3 detects the formed magnetic field to receive the request signal S transmitted from the in-vehicle device 1.

In the embodiment, the LF transmitter 13 generates two request signals to be transmitted from the transmission antenna 7. In the following explanation, the request signal S to be first transmitted is defined as "request signal S1" and the request signal S to be next transmitted is defined as "request signal S2" for distinction. The LF transmitter 13 outputs the request signal S1 and the request signal S2 in such a manner that the strength of the magnetic field in each of these request signals is made different. The LF transmitter 13 outputs the request signal S1 and the request signal S2, output strengths of which are made different from each other for the determination of the relay attack. The details of the determination of the relay attack will be described later. It should be noted that here, an explanation will be made of an example in which the output strength of the request signal S2 is made lower than the output strength of the request signal S1, however, it may be possible to make the output strength of the request signal S2 higher than the output strength of the request signal S1.

Figure 3:
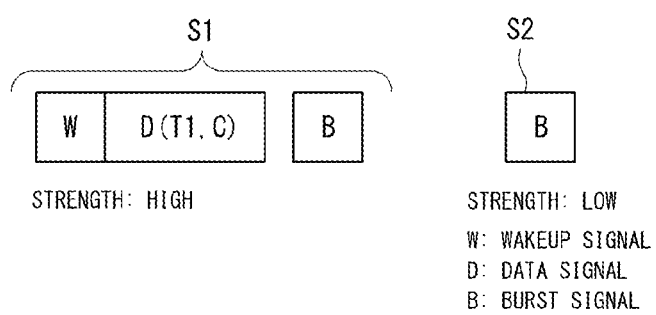
FIG. 3 is a diagram showing the configuration of a request signal.

FIG. 3 is a diagram showing the configuration of the request signals S1, S2 each.

As shown in FIG. 3, the request signal S1 to be first transmitted includes a wakeup signal W, a data signal D and a burst signal B. The data signal D includes a transmission completion time T1 and a cipher C, for example. The transmission completion time T is a time required for completing transmission of all of the request signal S1 and the request signal S2. The burst signal B is a signal for measuring a reception strength for relay attack determination on the portable device 3-side. The request signal S2 to be second transmitted includes the burst signal B only. It should be noted that the configuration of the request signals S1, S2 each in FIG. 3 is only shown as an example and may appropriately be modified to correspond to the purpose of communication.

In addition, in a case of setting the output strength of the request signal S1 to be lower than the output strength of the request signal S2 as described before, the output strength may be adjusted even in the same request signal in a way that portions of the wakeup signal W and the data signal D are made high in output strength and the burst signal B only is made low in output strength.

The control unit 20 (refer to FIG. 2) certifies the answer signal concerning the reception of the answer signal from the portable device 3. The details will be described later, but the answer signal includes the process result of the cipher C, which is included in the request signal S, in the portable device 3 (hereinafter, referred to as "portable device-side process result"). The control unit 20 collates the portable device-side process result with the in-vehicle device-side process result stored in the memory 12. Since the portable device 3 executes the same calculation process as the cipher processor 23 in the in-vehicle device 1. If the answer signal is transmitted from the corresponding portable device 3, the process result becomes identical. When the portable device-side process result is the same as the in-vehicle device-side process result, the control unit 20 certifies that the answer signal is transmitted from the portable device 3 corresponding thereto. When the control unit 20 certifies the answer signal, the control unit 20 outputs a drive command to the actuator drive circuit 15. The actuator drive circuit 15 drives the door lock actuator 9 to unlock the door.

Figure 4:
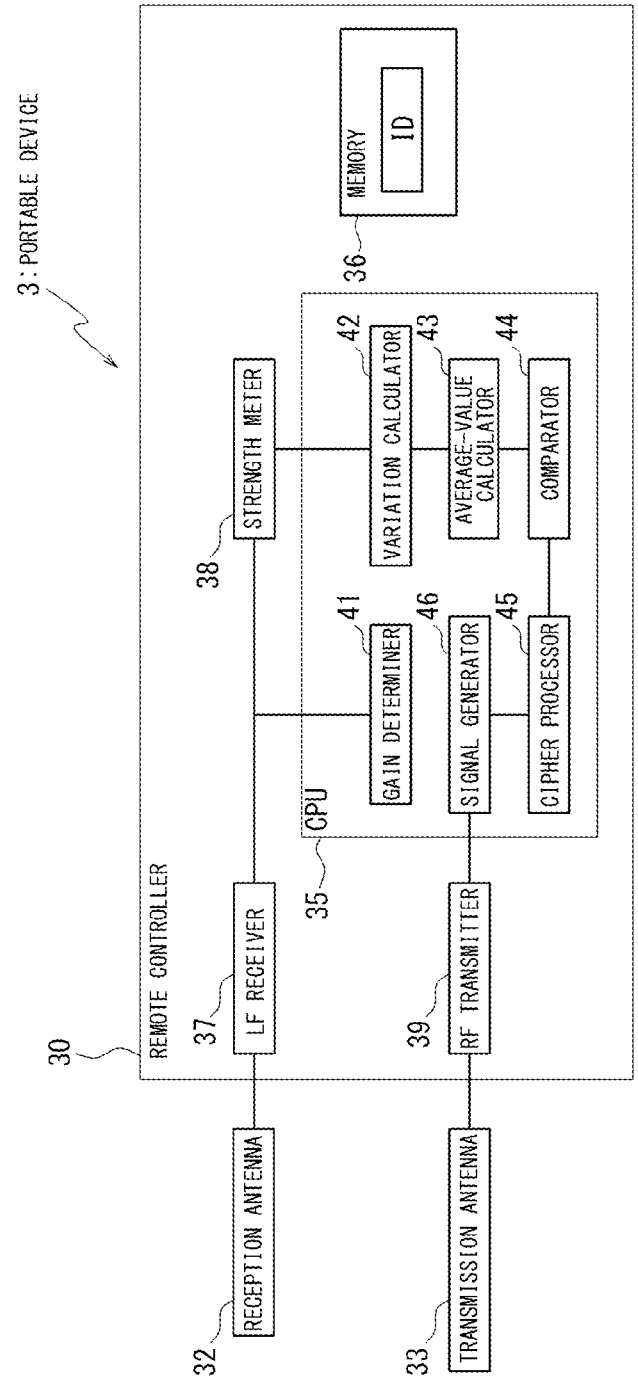
FIG. 4 is a block diagram showing the configuration of a portable device.

FIG. 4 is a block diagram showing the configuration of the portable device 3.

As shown in FIG. 4, the portable device 3 is provided with a remote controller 30, a reception antenna 32 and a transmission antenna 33.

The reception antenna 32 receives the request signal S transmitted by the in-vehicle device 1 and the transmission antenna 33 transmits the answer signal as the RF signal. The reception antenna 32 detects a magnetic field of the request signal S as the LF transmitting wave to receive the request signal S. As described above, since the request signals S1, S2 are transmitted sequentially, the reception antenna 32 as well receives the request signals S1, S2 sequentially.

The remote controller 30 executes an after-mentioned process to the request signal S received via the reception antenna 32 to generate the answer signal. The remote controller 30 causes the transmission antenna 33 to transmit the generated answer signal to the in-vehicle device 1 therefrom.

The remote controller 30 is provided with a CPU 35, an LF receiver 37, a strength meter 38, a RF transmitter 39 and a memory 36.

The LF receiver 37 is a reception circuit connected to the reception antenna 32.

Figure 5:
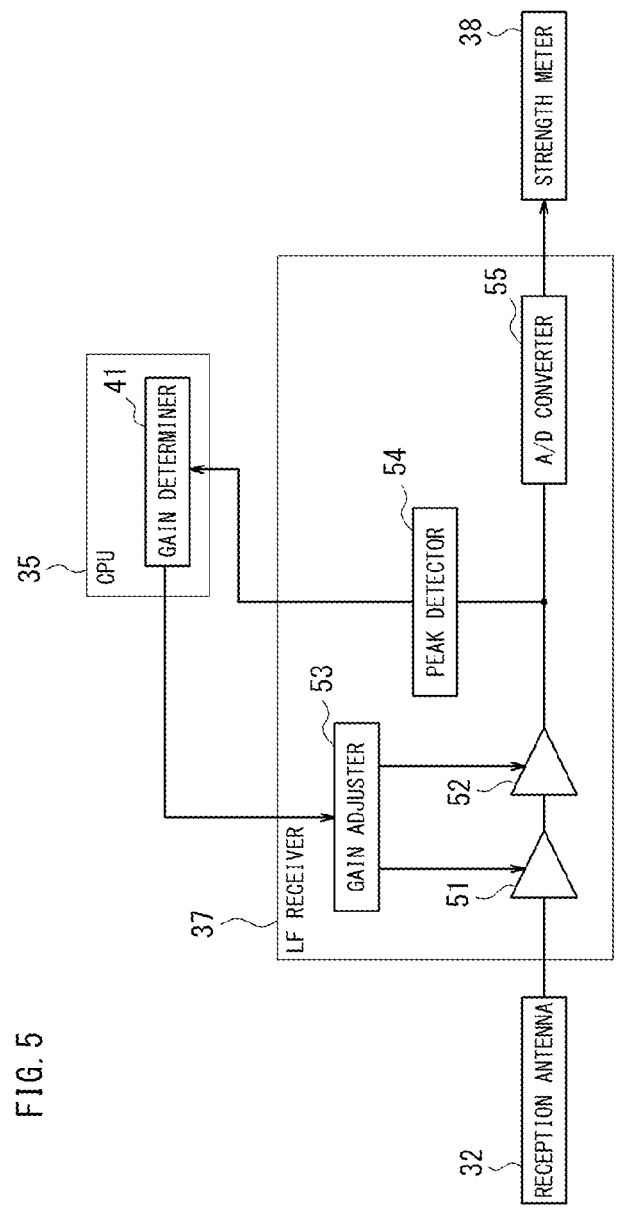
FIG. 5 is a diagram showing the configuration of an LF receiver.

FIG. 5 is a diagram showing the configuration of the LF receiver 37.

As shown in FIG. 5, the LF receiver 37 is provided with amplifiers 51, 52, a gain adjuster 53, a peak detector 54 and an A/D converter 55.

The amplifiers 51, 52 amplifies the request signal S received in the reception antenna 32. The gain at the time of amplifying the request signal S can be changed by switching the amplifiers 51, 52 to be used.

The gain adjuster 53 controls the amplifiers 51, 52 according to a control signal from a gain determiner 41 of the CPU 35 which will be described later to adjust the gain at the time of amplifying the request signal S.

The peak detector 54 detects a maximum amplitude of the request signal S outputted from the amplifiers 51, 52.

The A/D converter 55 converts the request signal S amplified in the amplifiers 51, 52 from an analogue signal to a digital signal.

The strength meter 38 is configured of, for example, a RSSI (Received Signal Strength Indication) circuit and the like. The strength meter 38 measures a reception strength of the request signal S converted into the digital signal by the A/D converter 55 in the LF receiver 37. Specifically, the strength meter 38 measures a reception strength of the burst signal B included in each of the request signals S1, S2. The strength meter 38 stores the measured reception strengths of the request signals S1, S2 in the memory 36.

Figure 6A:
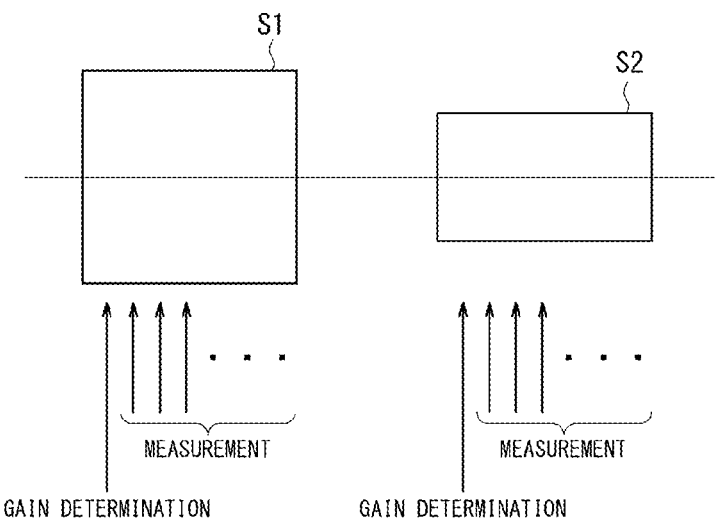
FIG. 6A is a diagram explaining a state in the measurement of a reception strength by a strength meter.
Figure 6B:
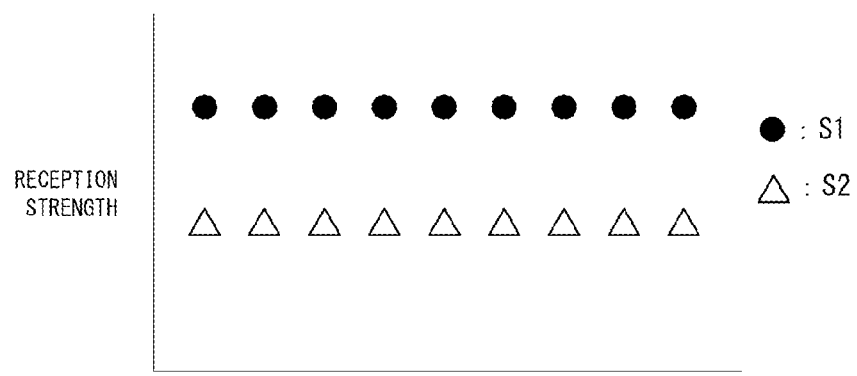
FIG. 6B is a graph showing an example of a measurement value of a reception strength of a request signal for each time.

FIG. 6A is a diagram explaining a state in the measurement of a reception strength by the strength meter 38, and FIG. 6B is a graph showing an example of a measurement value of respective measurement time regarding a reception strength of the request signals S1, S2.

As shown in FIG. 6A, the strength meter 38 performs the measurement by a plurality of times to each of the request signals S1, S2. The measurement number of times and the measurement interval can be set in advance. For example, the strength meter 38 may perform the measurement to each signal by 20 times at an interval of 1 ms.

Back to FIG. 4, the RF transmitter 39 outputs the answer signal as a RF signal from the transmission antenna 33. The memory 36 stores therein control programs of the remote controller 30 and information necessary for the process of the remote controller 30. The memory 36 stores therein ID of the portable device 3 as an example.

The CPU 35 executes integral control of the remote controller 30. Particularly, as the functional arrangement for executing the process to the request signal S, the CPU 35 is provided with the gain determiner 41, a variation calculator 42, an average-value calculator 43, a comparator 44, a cipher processor 45 and a signal generator 46.

As similar to the in-vehicle device 1, each part of the CPU 35 causes the process result to be temporarily stored in the memory 36, and reads out the necessary data and the process target from the memory 36 and resets the data temporarily stored after process completion. For example, as described before, the reception strength measured by the strength meter 38 is stored in the memory 36, but when the transmission of the answer signal in response to the received request signal S is completed, the CPU 35 deletes the reception strength from the memory 36.

It should be noted that the detailed explanation is omitted, but the portable device 3 may be structured to be provided with a control switch. When a user operates the control switch, it is possible to lock or unlock a door of a vehicle, or start an engine remotely.

The gain determiner 41 determines a gain of the amplifiers 51, 52 of the LF receiver 37 about each of the request signals S1, S2. As described before, the peak detector 54 of the LF receiver 37 detects, at the time of receiving the request signals S1, S2, the maximum amplitude of each of the request signals S1, S2. The gain determiner 41 determines the gain of each of the request signals S1, S2 based upon the detected maximum amplitude, and inputs a control signal into the gain adjuster 53. The gain determiner 41, for example, makes the gain large when the maximum amplitude of the received request signal S is small and makes the gain small when the maximum amplitude is large. It should be noted that after the request signals S1, S2 each are amplified by the gain determined by the gain determiner 41, the measurement of the reception strength is performed in the above-mentioned strength meter 38.

The variation calculator 42, the average-value calculator 43 and the comparator 44 execute the determination process of the relay attack to the request signals S1, S2.

The variation calculator 42 calculates variation in the reception strength about the request signal S2 measured in the strength meter 38 by a plurality of times.

The average-value calculator 43 obtains a measurement value of the request signals S1, S2 each measured in the strength meter 38 for each measurement time and calculates average values V1, V2 of the request signals S1, S2 respectively.

The comparator 44 compares the average value V1 of the request signal S1 with the average value V2 of the request signal S2, which are calculated by the average-value calculator 43.

However, in a case where the variation in the request signal S2 calculated in the variation calculator 42 is greater than the threshold value TH1, the comparator 44 does not execute the comparison and the process ends.

As described before, the in-vehicle device 1 transmits the request signals S1, S2, the output strengths of which are made different from each other. Therefore, in a case where the signals are appropriately transmitted from the in-vehicle device 1 to the portable device 3, the reception strengths of the request signals S1, S2 in the portable device 3 are also made different. As shown in FIG. 6B, the measurement value of the reception strength in the request signal S1 transmitted with a high output strength is higher than the measurement value of the reception strength in the request signal S2 transmitted with a low output strength.

On the other hand, in a case where the request signals S1, S2 are relayed by the relay device of performing the relay attack, there is a high possibility that the reception strengths of the two request signals S1, S2 become the same.

FIG. 7 is a diagram showing a mechanism of the relay attack.

As shown in FIG. 7, a third person trying an illegal unlock of a door in the vehicle V operates the request switch 5a when a user of the portable device 3 is distant from the vehicle V. The in-vehicle device 1 transmits the request signal S in response to the operation of the request switch 5a. The plurality of relay devices, which are installed between the portable device 3 and the vehicle V and each of which is provided with an antenna, relay this request signal S so that the portable device 3 in a distant place receives the request signal S.

When the portable device 3 sends back the answer signal to the request signal S transmitted by this relay device, the door is unlocked illegally. For coping with this relay attack, the in-vehicle device 1 transmits the request signals S1, S2, the output strengths of which are made different, from the transmission antenna 7. The portable device 3 executes the comparative process for comparing the output strengths of the request signals S1, S2. When the request signals S1, S2 are transmitted directly from the in-vehicle device 1 to the portable device 3, as shown in FIG. 6B the reception strengths of the request signals S1, S2 are respectively made different. On the other hand, since the relay device does not make a difference in output strength between the request signals S1, S2 to be relayed, the respective reception strengths of the request signals S1, S2 on the portable device 3-side become the same as shown in FIG. 7.

Therefore, in a case where it is determined that the strengths of the request signals S1, S2 are the same as a result of the comparative process in the comparator 44, the relay attack is determined and the portable device 3 does not send back the answer signal to the in-vehicle device 1, thus preventing illegal unlock of a door in the vehicle V.

It should be noted that since the measurement value possibly has an error from an actual strength due to noises or the like in the measurement of one time, the measurement of a reception strength is performed by a plurality of times and the average values V1, V2 of the reception strengths are calculated so as to obtain a value close to the actual strength.

In addition, there possibly occurs a slight difference between the average values V1, V2 in strength of the request signals S1, S2 due to noises or the like, even though the request signals S1, S2 are appropriately transmitted. Therefore, when the difference in strength between the request signals S1, S2 is in the extent that the strengths can be determined to be approximately identical in the comparator 44, the relay attack is determined.

However, depending the specification of the relay device, there is a possibility that the lower-strength signal is intermittently relayed.

Figure 8A:
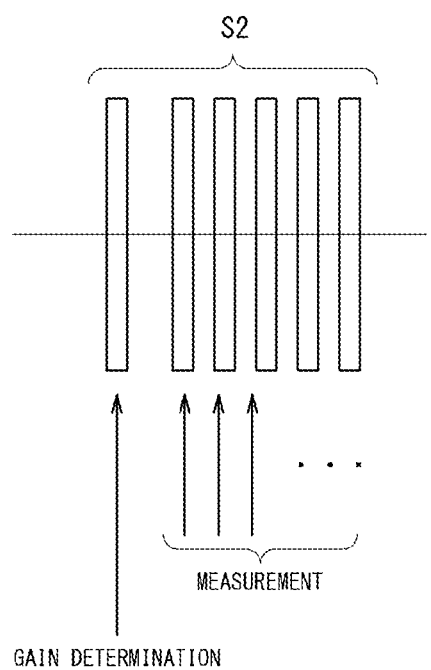
FIG. 8A is a diagram explaining a state where the request signal is intermittently relayed by a relay device.
Figure 8B:
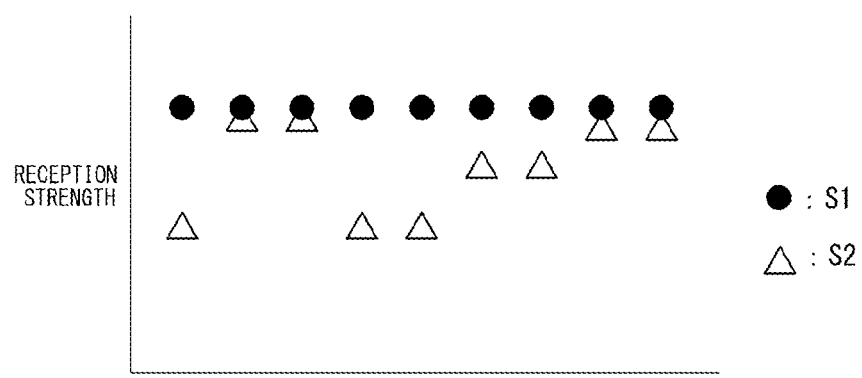
FIG. 8B is a diagram showing a measurement value of a reception strength of the request signal intermittently relayed.

FIG. 8A is a diagram explaining a state where the request signal S2 is intermittently relayed by the relay device, and FIG. 8B is a diagram showing a measurement value of a reception strength of the request signal S2 intermittently relayed.

The relay device tends to easily relay the signal as high in strength as the request signal S1 without interruption. On the other hand, as shown in FIG. 8A in a case where the strength of the request signal S2 is a level of going within or out of a detection range of the relay device, the relay device intermittently receives the request signal S2. The relay device transmits the intermittently received request signal S2 to the portable device 3 as it is. Thereby, at the time the portable device 3 receives the request signal S2, a state where input of the signal is present and a state where the input of the signal is interrupted are alternately repeated.

As described before, the strength meter 38 of the portable device 3 performs the measurement of the reception strength in each of the request signals S1, S2 by a plurality of times.

As shown in FIG. 8B, the measurement values of the request signal S1 in the plurality of times have no large variation and become uniform, since the input of the request signal S1 is not interrupted in the measurement for each time and the reception strength is appropriately measured.

On the other hand, regarding the request signal S2, which are intermittently relayed, the measurements are performed when the input of the signal is present and also when the input of the signal is interrupted. Therefore, there possibly occurs a large variation in the measurement values by a plurality of times.

If the average value is calculated with the measurement values of the request signal S2 having such variation, the average value V2 possibly deviates from the actual strength of the request signal S2, which are relayed by the relay device. As a result, there is a possibility that the comparative process of the average value V1 of the request signal S1 and the average value V2 of the request signal S2 cannot be executed appropriately.

As measures against such case, in the embodiment the variation calculator 42 calculates variation in the measurement value of the reception strength of the request signal S2. In a case where a magnitude of the variation indicates a communication failure, that is, a possibility of intermittent relay due to the relay attack, the comparator 44 determines the relay attack without the comparative process of the reception strength.

The details of the processes of the average-value calculator 43, the variation calculator 42 and the comparator 44 will be described later using flow charts.

Back to FIG. 4, in a case where it is determined to be capable of transmitting the answer signal as a result of the comparative process in the comparator 42, the cipher processor 43 processes/calculates the cipher C (refer to FIG. 3) included in the data signal D of the request signal S1 by a predetermined calculation process. The predetermined calculation process incorporates therein ID of the portable device 3, and is the same calculation process as the cipher processor 23 in the in-vehicle device 1. The cipher processor 45 inputs the portable device-side process result into the signal generator 46.

The signal generator 46 generates an answer signal including the portable device-side process result, and sends the answer signal to the RF transmitter 39. The RF transmitter 39 outputs the answer signal as a RF signal from the transmission antenna 33.

Hereinafter, the process of the keyless entry system will be explained separately on the in-vehicle device 1-side and the portable device 3-side.

Figure 9:
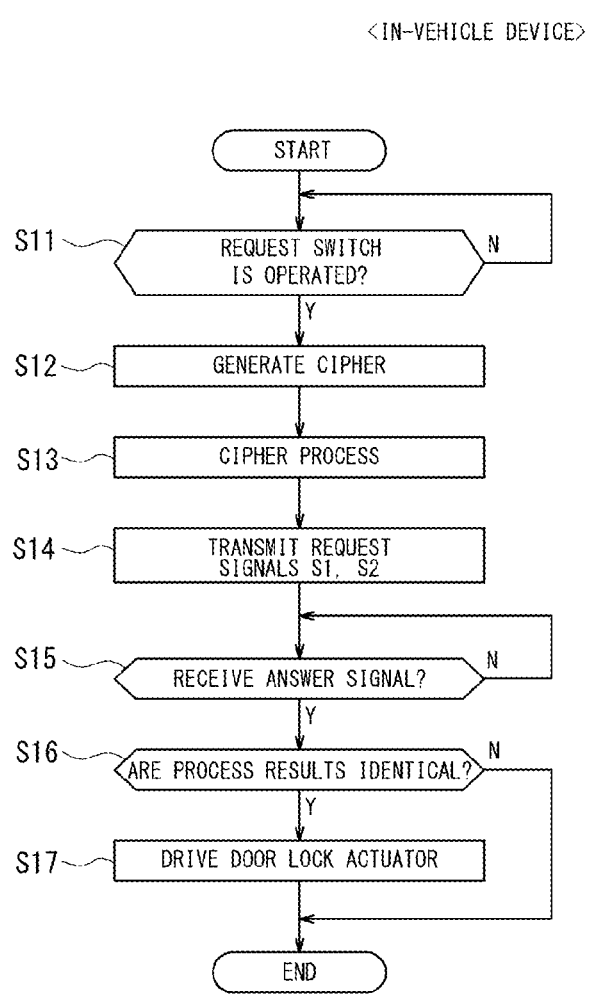
FIG. 9 is a flow chart showing a process of the in-vehicle device.

FIG. 9 is a flow chart showing the process of the in-vehicle device 1.

As shown in FIG. 9, when any of the request switches 5a, 5b, 5c is operated by a user (step S11:Yes), the switch determiner 21 determines which switch is operated and causes the operated switch to be stored in the memory 12.

The control unit 20 generates a cipher C caused to be included in the request signal S (step S12). The control unit 20 inputs a process command together with the generated cipher C into the cipher processor 23. The control unit 20 inputs a signal generating command together with the cipher C into the signal generator 22.

The cipher processor 23 processes/calculates the cipher C by the predetermined calculation process according to a process command, and stores the in-vehicle device-side process result in the memory 12 (step S13).

The signal generator 22 generates the request signal S according to the signal generating command and controls the LF transmitter 13 to cause the request signals S1, S2 to be transmitted from the transmission antenna 7 (step S14)

The control unit 20 waits for the answer signal from the portable device 3 when the transmission of the request signals S1, S2 is completed (step S15). It should be noted that the control unit 20 refers to a timer and in a case where the answer signal is not received even after a predetermined response waiting time elapses, completes the process.

When the control unit 20 receives the answer signal (step 15: Yes), the control unit 20 collates the portable device-side process result included in the answer signal with the in-vehicle device-side process result stored in the memory 12 (step S16). The control unit 20, in a case where the portable device-side process result is not identical to the in-vehicle device-side process result (step S16: No), completes the process. The control unit 20, in a case where the portable device-side process result is identical to the in-vehicle device-side process result (step S16: Yes), outputs a drive command to the actuator drive circuit 15. The actuator drive circuit 15 drives the door lock actuator 9 (step S17) to release the door lock.

Figure 10:
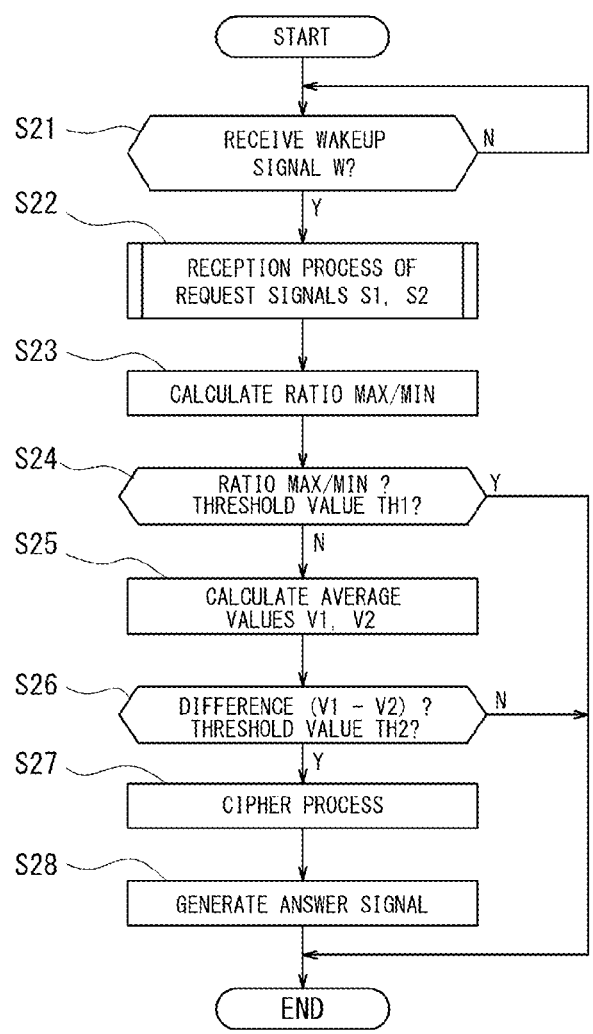
FIG. 10 is a flow chart showing a process of the portable device.

FIG. 10 is a flow chart showing the process in the portable device 3.

The remote controller 30 in the portable device 3 is kept in a sleep mode until the request signal S is received except for a case where the control switch of the portable device 3 is operated. As shown in FIG. 10, when the remote controller 30 receives a wakeup signal W included in the request signal S (step S21: Yes), the remote controller 30 releases the sleep mode.

The remote controller 30 refers to a transmission completion time T1 included in the data D of the request signal S1 and executes reception processes of the request signal S1 and the request signal S2 transmitted within the transmission completion time T1 (step S22).

Figure 11:
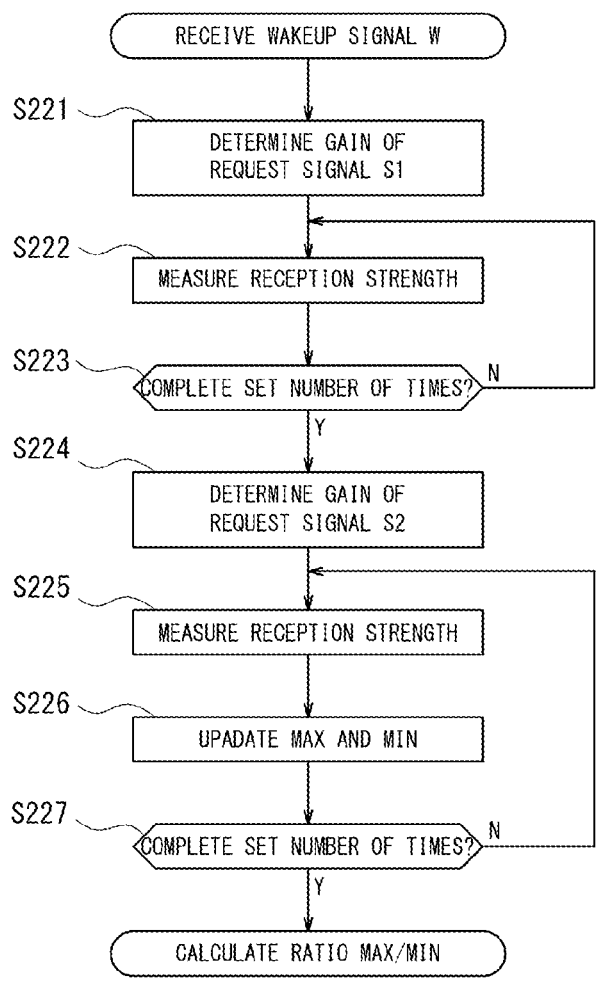
FIG. 11 is a flow chart showing the details of a reception process of the request signal.

FIG. 11 is a flow chart showing the details of the reception process of the request signals S1, S2.

The peak detector 54 (refer to FIG. 5) of the LF receiver 37 detects, at the time the request signal S1 is received in the reception antenna 32, the maximum amplitude of the request signal S1.

As shown in FIG. 11, the gain determiner 41 of the CPU 35 determines a gain of the amplifiers 51, 52, based upon the maximum amplitude of the request signal S1 (step S221).

The gain adjuster 53 controls the amplifiers 51, 52 in response to a control signal from the gain determiner 41 and amplifies the request signal S1 by the gain determined in the gain determiner 41.

The strength meter 38 measures the reception strength of the request signal S1 amplified in the amplifiers 51, 52 and converted from an analogue signal to a digital signal in the A/D converter 55 (step S222).

The strength meter 38 measures the reception strength of the request signal S1 by the preset number of times and causes the measurement value for each time to be stored in the memory 36 sequentially.

When the strength meter 38 completes the measurements by the preset number of times (step S223: Yes), subsequently the reception process of the request signal S2 is executed.

The peak detector 54 detects, at the time the request signal S2 is received in the reception antenna 32, the maximum amplitude of the request signal S2.

The gain determiner 41 of the CPU 35 determines a gain of the amplifiers 51, 52, based upon the maximum amplitude of the request signal S2 (step S224), and inputs a control signal into the gain adjuster 53.

The gain adjuster 53 controls the amplifiers 51, 52 in response to the control signal from the gain determiner 41 and amplifies the request signal S2 by the gain determined in the gain determiner 41.

The strength meter 38 measures the reception strength of the request signal S2 amplified in the amplifiers 51, 52 and converted from an analogue signal to a digital signal in the A/D converter 55 (step S225).

The strength meter 38 measures the reception strength of the request signal S2 by the preset number of times and causes the measurement value for each time to be stored in the memory 36 sequentially.

Further, the variation calculator 42 updates a maximum value MAX and a minimum value MIN of the measurement values for each time the measurement value of the request signal S2 of each time is obtained (step S226).

As described before, the variation calculator 42 calculates the variation in the measurement values for determining a possibility that the request signal S2, which is lower in strength is intermittently relayed by the relay attack. A specific calculation method for the variation is not limited to a particular method. For example, a difference between the maximum value MAX and the minimum value MIN of the measurement values can be an index indicating a magnitude of the variation in the measurement value. Therefore, in the embodiment, the variation calculator 42 obtains the measurement values of the strength meter 38 and records the maximum value MAX and the minimum value MIN.

The variation calculator 42, when a new measurement value is stored in the memory 36 by the strength meter 38, obtains the measurement value and compares the measurement value with the maximum value MAX and the minimum value MIN, that are already recorded. When the measurement value newly obtained is greater than the maximum value MAX, the maximum value MAX is updated to the obtained measurement value. When the measurement value newly obtained is smaller than the minimum value MIN, the minimum value MIN is updated to the obtained measurement value.

It should be noted that in an example of the embodiment, the variation calculator 42 only calculates the variation of the request signal S2 having lower output strength a tendency to be easily relayed intermittently, thereby improving the process efficiency. However, the variation calculation may be performed also to the request signal S1, since there is a possibility that the request signal S1 having higher output strength is also intermittently relayed.

When the strength meter 38 completes the measurements by the preset number of times (step S227: Yes), the reception process of the request signal S2 ends.

Back to FIG. 10, the variation calculator 42 obtains the maximum value MAX and the minimum value MIN of the measurement values in the reception strength of the request signal S2 stored in the memory 36 and calculates a ratio MAX/MIN of them (step S23). The ratio MAX/MIN indicates a difference between the maximum value MAX and the minimum value MIN of the measurement values, that is, becomes an index indicating a magnitude of variation in the measurement value of the request signal S2. When the ratio MAX/MIN is large, it is possible to determine a high possibility that the request signal S2 is intermittently relayed by the relay device performing the relay attack. The variation calculator 42 inputs the calculation result into the comparator 44.

It should be noted that other methods for calculating variation may include, such as, a method for calculating a ratio between the maximum value MAX of the measurement values and the average value V2, a method for calculating a ratio between the minimum value MIN of the measurement values and the average value V2, a method for calculating root-mean-square 6 of the measurement value or the like. A plurality of such calculation methods may be combined.

The comparator 44 compares the ratio MAX/MIN calculated by the variation calculator 42 with the threshold value Th1 (step S24). The threshold value TH1 is a reference value for determining whether or not the variation in the measurement value of the reception strength indicates a possibility of a communication failure, that is, the intermittent relay by the relay attack.

The TH1 can be set by conducting tests or simulation as needed. For example, the TH1 can be set according to a distance between the portable device 3 and the transmission antenna 7 of the in-vehicle device 1 at the time a user of the portable device 3 operates the request switch 5 (refer to FIG. 1). This distance has a tendency of being longer as a vehicle is the larger, for example. As the distance is longer, the variation tends to easily occur even in a case where the request signals S1, S2 are appropriately transmitted from the in-vehicle device 1 to the portable device 3. In such case, the threshold value TH1 may be set to be large.

The comparator 44, when the ratio MAX/MIN is equal to or more than the threshold value TH1 (step S24: Yes), completes the process without sending back the answer signal, since the variation in the measurement value is large and a possibility that the signal is intermittently relayed by the relay device of the relay attack is high.

The comparator 44, when the ratio MAX/MIN is less than the threshold value TH1 (step S24: No), inputs the comparative result into the average-value calculator 43.

The average-value calculator 43 calculates the respective average values V1, V2 from the measurement values of the request signal S1 and the request signal S2 respectively (step S25).

The average-value calculator 43 calculates the respective average values V1, V2 from the measurement values of the request signal S1 and the request signal S2 respectively (step S25).

The average-value calculator 43 inputs the calculation result into the comparator 44.

The comparator 44 compares a difference (V1−V2) in reception strength between the request signals S1, S2 with the threshold value TH2 as the comparative process (step S26). Specifically the comparator 44 compares a difference between the average value V1 and average value V2 inputted from the average-value calculator 43 as the difference (V1−V2) in reception strength.

As described before, even in a case where the request signals S1, S2 are relayed by the relay device, there is possibility that a slight error occurs in strength between the request signals S1, S2 due to noises or the like. Further, even in a case where the request signals S1, S2 are appropriately transmitted from the in-vehicle device 1 to the portable device 3, there is a possibility that the difference in reception strength is made smaller than the difference in output strength due to an error of noises or the like. The threshold value TH2 may be set as a value in consideration of these errors.

The comparator 44, when the difference (V1−V2) is less than the threshold value TH2 (step S26: No), completes the process without sending back the answer signal since there is a high possibility that the signal is relayed by the relay device of the relay attack.

The comparator 44, when the difference (V1−V2) is equal to or more than the threshold value TH2 (step S26: Yes), inputs the process result into the cipher processor 45.

When the process result is inputted thereto from the comparator 44, the cipher processor 45 obtains the cipher C included in the data D of the request signal S1, calculates the cipher C by a predetermined calculation process (step S27) and inputs the calculated portable-device side process result into the signal generator 46. The signal generator 46 generates the answer signal including the portable-device side process result. The signal generator 46 controls the RF transmitter 39 to transmit the answer signal from the transmission antenna 33 (step S28).

The remote controller 30 returns back to the sleep state from the usual operation state after sending back the answer signal, and completes the process.

As described above, the relay attack determination device according to the embodiment:

(1) determines a so-called relay attack, in which wireless communications between the in-vehicle device 1 and the portable device 3 are relayed by the relay device.

The relay attack determination device includes:

the LF transmitter 13 (transmitter) disposed on the in-vehicle device 1, the LF transmitter 13 being configured to transmit the request signal S1 (first signal) and the request signal S2 (second signal) having the output strength (output condition) different from that in the request signal S1;

the LF receiver 37 (receiver) disposed on the portable device 3 to receive the request signal S1 and the request signal S2;

the strength meter 38 configured to measure the reception strength by a plurality of times in each of the request signal S1 and the request signal S2 received by the LF receiver 37;

the comparator 44 (comparator, determiner) configured to execute the comparative process of the request signal S1 and the request signal S2 by using the average values V1, V2 of the reception strengths measured by the strength meter 38 and determine the relay attack based upon a result of the comparative process; and the variation calculator 42 configured to calculate the variation in the reception strength measured by a plurality of times in the strength meter 38 regarding the request signal S2, as a signal having lower reception strength between the request signal S1 and the request signal S2, wherein in a case where the variation in the reception strength exceeds the threshold value TH1 indicating the communication failure in the request signal S2, the comparator 44 determines the relay attack regardless of the result of the comparative process.

As a method for determining the relay attack in the keyless entry system, the request signal S1 and the request signal S2 different in strength are transmitted from the in-vehicle device 1 and the respective reception strengths of the request signal S1 and the request signal S2 received by the portable device 3 are measured for comparison. When the request signal S1 and the request signal S2 are transmitted directly from the in-vehicle device 1 to the portable device 3, the reception strength of the request signal S1 is made different from that of the request signal S2. On the other hand, in a case where the request signal S1 and the request signal S2 are transmitted via the relay device of the relay attack to the portable device 3, the reception strengths of the two request signals S1, S2 are the same. Therefore, in the relay attack determination device, it is possible to determine the relay attack by the comparative process for the reception strengths of the request signals S1, S2.

However, there is a possibility that the request signal S2 having lower strength is intermittently relayed depending upon the specification of the relay device. In the portable device 3, the measurement of the strength is performed to each of the request signals S1, S2 by a plurality of times and the average values V1, V2 of the measurement values are calculated, which are used for the comparative process. Here, in a case where the request signals S1, S2 having lower strength are intermittently relayed, the measurement value possibly varies in the measurement by a plurality of times. When the average values V1, V2 are calculated from the measurement values that have varied, a difference between the average values V1, V2 becomes large although the signals are relayed by the relay device, posing a possibility that an appropriate comparative process cannot be executed.

Therefore, in the embodiment, the variation calculator 42 calculates the variation in the measurement values of the plurality of times about the request signal S2 having lower strength. When the variation is large, because of a high possibility of a communication failure, that is, intermittent relay by the relay attack, the comparator 44 determines the relay attack without the result of the comparative process. Thereby, it is possible to improve the security of the keyless entry system.

(2) The LF transmitter 13 transmits the request signal S2 having the output strength made lower than the request signal S1, and the variation calculator 42 calculates the variation in the reception strength of the request signal S2.

The signal having lower output strength tends to be easily subjected to intermittent relay and tends to easily vary. It is possible to improve the process efficiency by calculating only the variation in the reception strength of the request signal S2 having lower output strength. It should be noted that if the output strength in the request signal S1 is set to be lower, the variation in the reception strength of the request signal S1 may be calculated.

(3) The variation calculator 42 calculates the ratio MAX/MIN of the maximum value MAX and the minimum value MIN of the reception strengths measured by a plurality of times in the strength meter 38 as the variation in the reception strength.

Various methods may be considered as calculations of variation, and the ratio MAX/MIN of the maximum value MAX and the minimum value MIN is easy in calculation and a time also required for the process is a little. Further, when an update process of the maximum value MAX and the minimum value MIN is executed for each time of obtaining the measurement value, it is possible to reduce a consumption amount of the memory 36 as well.

It should be noted that in the embodiment the ratio MAX/MIN is calculated as a value indicating the difference between the maximum value MAX and the minimum value MIN, but, for example, in a case of using the RSSI circuit outputting the RSSI value by a logarithmic scale or the like, the difference between the maximum value MAX and the minimum value MIN may be used as an index directly indicating the variation in the reception strength.

[Modification 1]

In the embodiment, the explanation is made of the aspect in which the possibility of the intermittent relay by the relay attack is determined from the magnitude of the variation in measurement value of the reception strengths of the request signals S1, S2. In Modification 1, in addition to this aspect, the possibility of the intermittent relay is determined using the output of the amplifiers 51, 52 as a reference.

Figure 12:
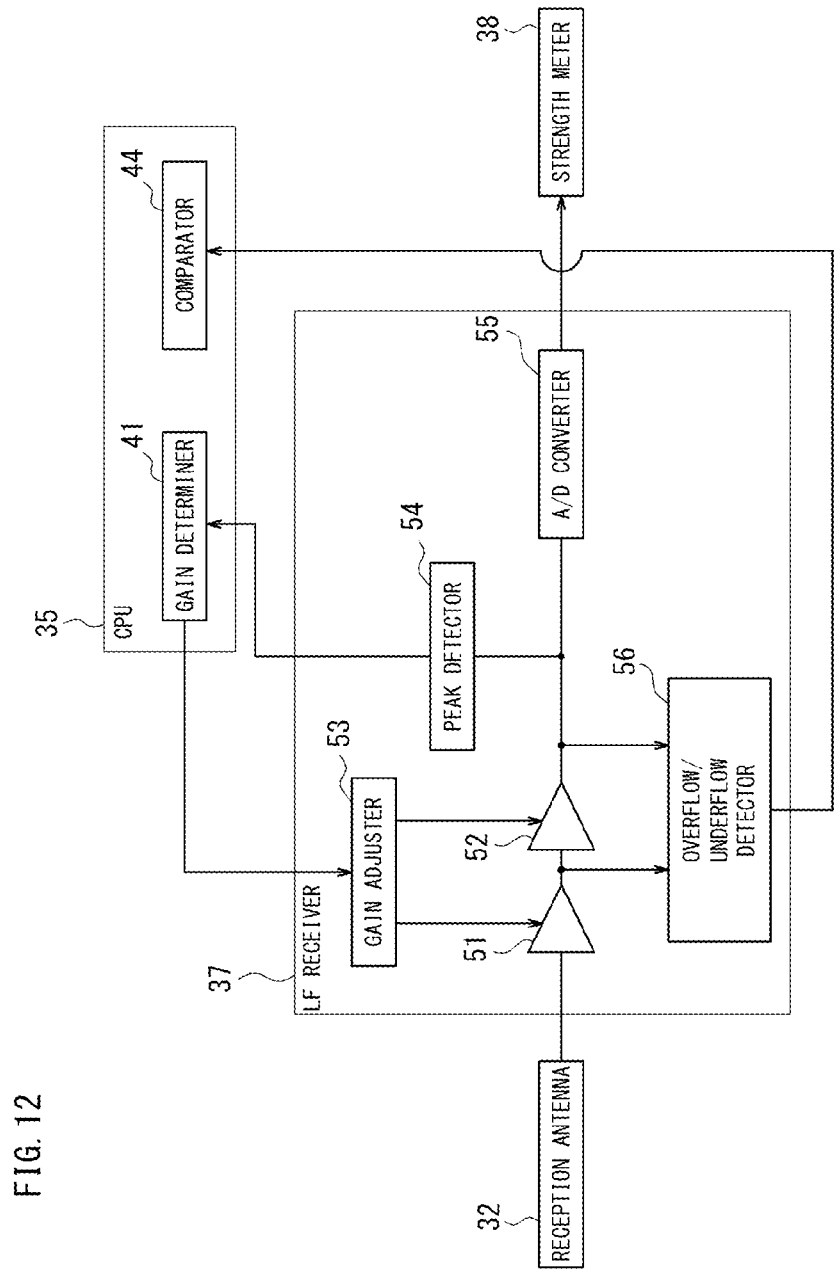
FIG. 12 is a diagram showing the configuration of an LF receiver in a relay attack determination device according to Modification 1.

FIG. 12 is a diagram explaining the configuration of the LF receiver 37 in a relay attack determination device according to Modification 1.

As shown in FIG. 12, in Modification 1 the LF receiver 37 is provided with an overflow/underflow detector 56 in addition to the same configuration as the embodiment. The overflow/underflow detector 56 detects overflow in which an output level from the amplifiers 51, 52 is saturated with an upper limit of a predetermined range. The overflow/underflow detector 56 also detects underflow in which the output level from the amplifiers 51, 52 falls below a lower limit thereof. Since the other components of Modification 1 are similar to those to the above-described embodiment, a detailed explanation thereof is omitted.

In Modification 1, the portable device 3, in a case where the overflow/underflow detector 56 detects the overflow or the underflow of the output from the amplifiers 51, 52 at the time of receiving the request signals S1, S2, determines the intermittent relay by the relay attack.

Figure 13A:
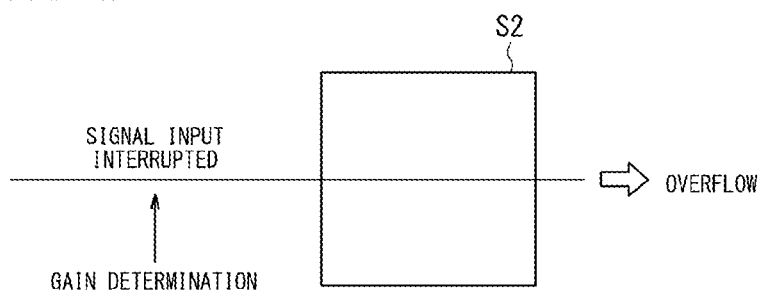
FIG. 13A is a diagram showing an example in which overflow occurs in an amplifier at the time the portable device receives the request signal intermittently relayed and FIG. 13B is a diagram showing an example in which underflow occurs in the amplifier at the time the portable device receives the request signal intermittently relayed.
Figure 13B:
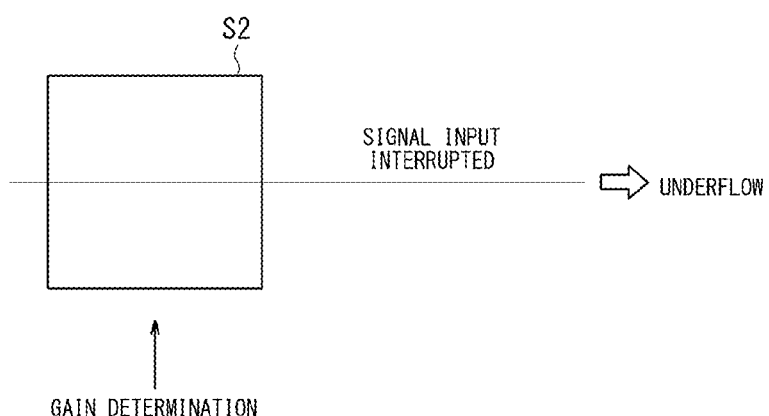

FIG. 13A shows an example in which the overflow occurs in the amplifiers 51, 52 at the time the portable device 3 receives the request signal S2 intermittently relayed, and FIG. 13B shows an example in which the underflow occurs.

As described before, at the time the portable device 3 receives the request signals S1, S2, the gain determiner 41 (refer to FIG. 4) of the CPU 35 determines a gain in the amplifiers 51, 52 based upon the maximum value detected in the peak detector 54. However, if the request signal S2 having lower strength is intermittently relayed by the relay device, as shown in FIG. 13A, there is a possibility that the input of the request signal S2 is interrupted at the gain determining time.

In this case, since the maximum amplitude detected by the peak detector becomes small, the gain determiner 41 sets a gain for amplifying the request signal S2 to be large. However, the request signal S2 is inputted after the gain determination, the output level from the amplifiers 51, 52 possibly comes to the overflow, since the request signal S2 is amplified through the amplifiers 51, 52 by the gain largely set.

In contrast, the intermittent relay may occur in a case as shown in FIG. 13B. The request signal S2 is inputted at the gain determining time, but thereafter, the input of the request signal S2 is interrupted. In this case, the gain determiner 41 sets the gain for amplifying the request signal S2 to be small, since the maximum amplitude detected by the peak detector becomes large. However, when the input of the request signal S2 is interrupted after the gain determination, the output level from the amplifiers 51, 52 possibly comes to the underflow.

In this way, in a case where the request signal S2 is intermittently relayed by the relay device of the relay attack, input state of the signal may change between at the gain determining time and after the time. This may occur a case where the output level from the amplifiers 51, 52 comes to the overflow or the underflow. Accordingly in Modification 1, the overflow/underflow detector 56 is disposed in the LF receiver 37 to detect the overflow or the underflow of the amplifiers 51, 52, thus determining a possibility of the intermittent relay by the relay attack.

Figure 14:
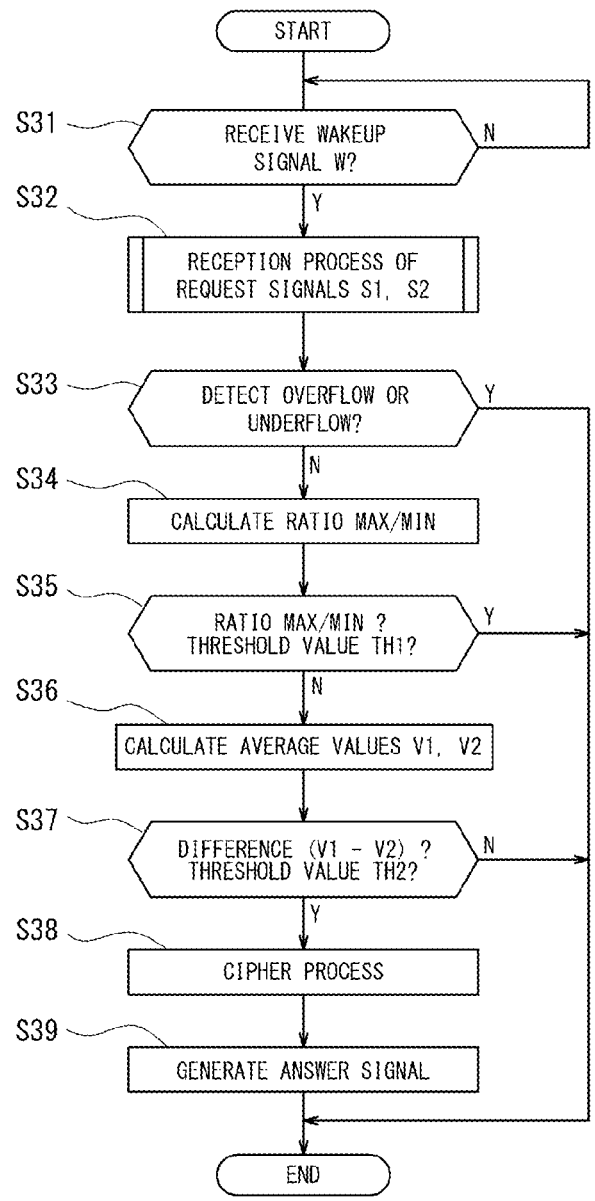
FIG. 14 is a flow chart showing a process of a portable device according to Modification 1.

FIG. 14 is a flow chart showing the process of the portable device 3 according to Modification 1.

As shown in FIG. 14, in Modification 1, when a wakeup signal W is received (step S31: Yes), the reception process of the request signals S1, S2 is executed in the same way as the embodiment (step S32). In Modification 1, in a case where the overflow/underflow detector 56 detects the overflow or the underflow of the amplifiers 51, 52 (step S33: Yes), the comparator 44 completes the process without executing step S34 to S39. Thereby, in a case where the overflow or the underflow is detected, since the relay attack can be determined without executing the variation calculation, the average-value calculation and the comparative process of strength, a quick determination is made possible.

In a case where the overflow or the underflow of the amplifiers 51, 52 is not detected in the overflow/underflow detector 56 (step S33: No), the processes of step S34 to S39 are executed in the same way as the embodiment. It should be noted that since the processes of step S34 to S39 are the same as the processes of step S23 to S28 (refer to FIG. 10) in the embodiment, the explanation is omitted.

As described above, the relay attack determination device according to Modification 1 includes:

(4) the peak detector 54 (peak detector) configured to detect the maximum amplitude of the request signal S1 and the request signal S2;

the gain determiner 41 configured to determine the gain of each of the request signal S1 and the request signal S2 based upon the maximum amplitude; and the amplifiers 51, 52 configured to amplify the request signal S1 and the request signal S2 by the respective gains determined in the gain determiner 41, wherein the strength meter 38 measures the reception strength of each of the request signal S1 and the request signal S2 amplified in the amplifiers 51, 52.

Further, the relay attack determination device is provided with the overflow/underflow detector 56 (detector) for detecting the overflow or the underflow of the output of the amplifiers 51, 52. In a case where the overflow or the underflow of the amplifiers 51, 52 is detected by the detector at the measuring time of the reception strength of the request signal S2, the comparator 44 determines the relay attack without the result of the comparative process.

In a case where the request signal S2 having lower strength is intermittently relayed by the relay device and the input state of the signal changes between the gain determining time and after the time, thereby occurring the overflow or the underflow of output of the amplifiers 51, 52. In this case, by determining the relay attack, it is possible to improve the security of the keyless entry system in addition to the process in the embodiment. In addition, it is possible to complete the process by determining the relay attack before executing the variation calculation and the comparative process. Therefore, it is possible to reduce the process load in the portable device 3.

[Modification 2]

Modification 2 focuses attention on a case where the measurement value in the strength meter 38 deviates from the usable range due to a change in an input state of the signal between the gain determining time and after the time. Modification 2 adds a determination method of the relay attack to the embodiment in the same way as Modification 1.

Figure 15A:
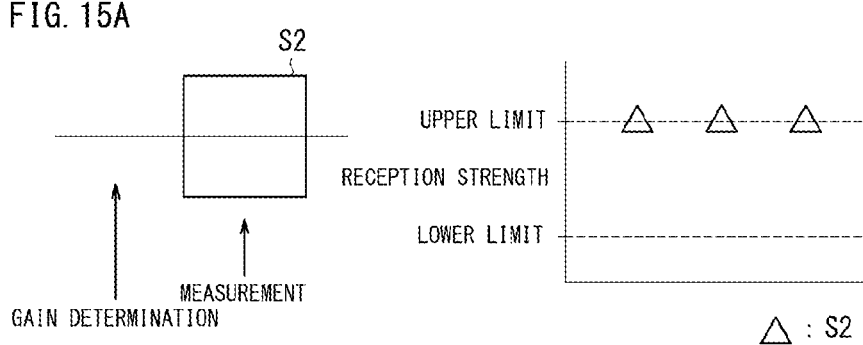
FIGS. 15A and 15B are diagrams showing a change in an input state of a signal at the gain determining time and at the strength measuring time according to Modification 2.
Figure 15B:
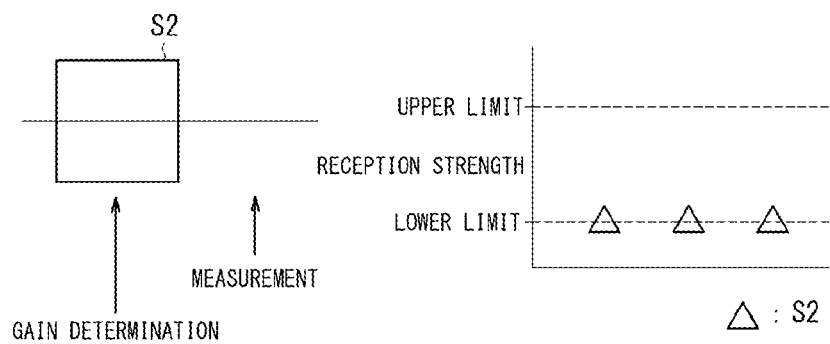

FIGS. 15A and 15B are diagrams indicating a change in an input state of a signal at the gain determining time and at the strength measuring time according to Modification 2.

FIG. 15A shows a state where the request signal S2 having lower strength is intermittently relayed by the relay device and the input of the request signal S2 is interrupted at the gain determining time, though the input of the request signal S2 is present at the strength measuring time after the gain determining time.

As explained in Modification 1, if the input is interrupted at the gain determining time, the gain of the request signal S2 is set to a large value. The request signal S2 to be inputted at the measuring time of the strength meter 38 is largely amplified by the set gain.

Here, the strength meter 38 configured of the RSSI circuit and the like has limitation to the a range of the reception strength which can be measured accurately and is usable in the average-value calculation and the variation calculation (hereinafter, referred to as "use possible range"). Therefore, in a case where the reception strength of the request signal S2 outputted from the amplifiers 51, 52 deviates from the usable range, there is a possibility that an accurate measurement value corresponding to an actual reception strength is not indicated. In this case, the measurement value is, for example, an erroneous value or becomes in a state of sticking to the upper limit or the lower limit of the usable range.

FIG. 15A shows a state where, since the actual reception strength of the request signal S2 largely amplified exceeds the usable range, the measurement value sticks to the upper limit of the usable range.

In contrast, FIG. 15B shows a state where, the input of the request signal S2 is present at the gain determining time but the input of the request signal S2 is interrupted at the strength measuring time after the gain determination.

In this case, the gain of the request signal S2 is set to be small but the input of the request signal S2 is interrupted at the strength measuring time. In this case, there is a possibility that the reception strength of the request signal S2 outputted from the amplifiers 51, 52 becomes as low as to fall below the usable range of the strength meter 38. In this case, as shown in FIG. 15B, the measurement value becomes in a state of sticking to the lower limit of the usable range.

In this way, in a case where the request signal S2 is intermittently relayed by the relay device of the relay attack, there is a possibility that the measurement value in the strength meter 38 deviates from the usable range due to a change in an input state of the signal between at the gain determining time and at the strength measuring time. Therefore, in Modification 2, the comparator 44 determines a possibility of the intermittent relay by the relay attack when the measurement values measured in the strength meter 38 includes the value which deviates from the usable range. The usable range of the measurement value is in advance set by conducting tests or simulation and is stored in the memory 36. For example, when the strength meter 38 can obtain 0 to 1023 of 10 bits as the measurement value, the usable range of the measurement value can be set as 100 to 800.

Figure 16:
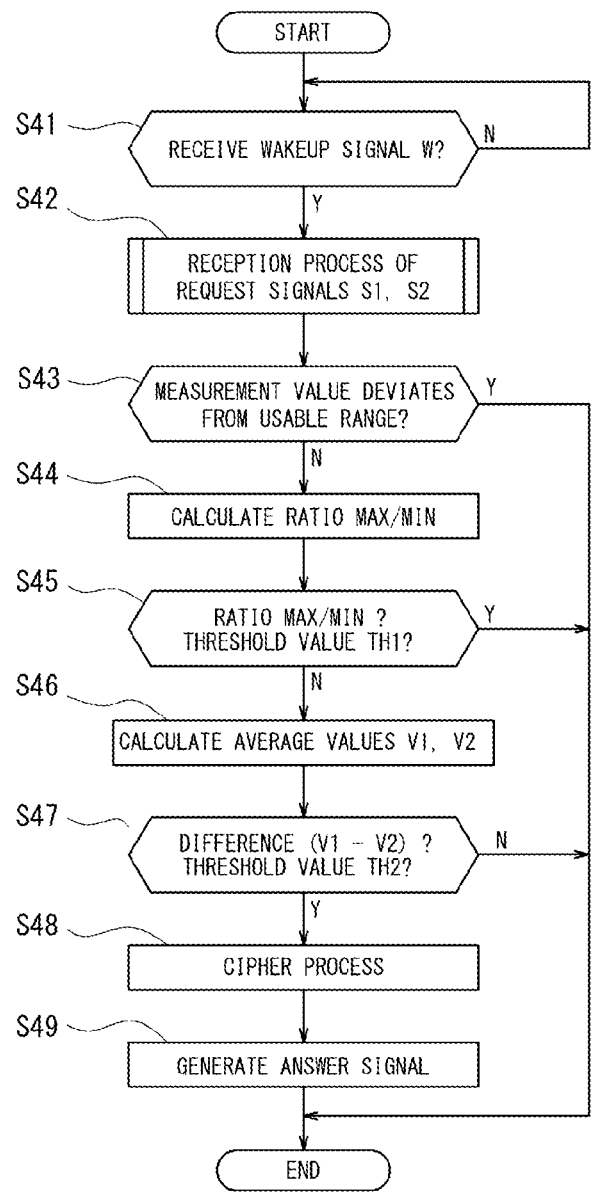
FIG. 16 is a flow chart showing a process of a portable device according to Modification 2.

FIG. 16 is a flow chart showing the process of the portable device 3 according to Modification 2.

As shown in FIG. 16, in Modification 2 when a wakeup signal W is received (step S41: Yes), the reception process of the request signals S1, S2 is executed in the same way as the embodiment (step S42). In Modification 1, after completion of the reception process, the comparator 44 refers to each measurement value of the request signal S2. When the comparator 44 finds a measurement value that deviates from the usable range (step S43: Yes), the comparator 44 determines the relay attack and completes the process without executing step S44 to S49.

A specific process for determining "deviation from the usable range" of the measurement value is determined according to the performance or the specification of the strength meter 38. For example, the strength meter 38 has a specification in which the measurement value of the strength meter 38 sticks to the upper limit or the lower limit when the reception strength deviates from the usable range. In this specification, the comparator 44 may determine the relay attack if the measurement value indicates the upper limit or the lower limit. For example, in a case where the usable range of the measurement value of the strength meter 38 is a range of 100 to 800, the relay attack may be determined when the measurement value indicates 100 or 800.

Alternatively, when the strength meter 38 has a specification which outputs also a value out of the usable range, the comparator 44 may determine the relay attack in a case where the measurement value indicates the value out of the usable range. For example, in a case where the usable range of the measurement value of the strength meter 38 is a range of 100 to 800, the comparator 44 may determine the relay attack when the measurement value indicates a value 95, 901 or the like out of the usable range.

In this way, by executing the reference process of the request signal S2 in a case where the measurement value deviates from the usable range, the quick determination is made possible since the relay attack can be determined before executing the variation calculation, the average-value calculation and the comparative process of strength.

It should be noted that step S43 only refers to the measurement value of the request signal S2 having lower strength and having a tendency to be easily relayed intermittently. However, the measurement value of the request signal S1 also may be referred to, since there is also a possibility that the request signal S1 having higher strength is intermittently relayed.

Since the processes of step S44 to S49 are the same as those of step S23 to S28 in the embodiment (refer to FIG. 10), a detailed explanation thereof is omitted.

As described above, in the relay attack determination device according to Modification 2, (5) in a case where the measurement value of the reception strength of the request signal S2 measured in the strength meter 38 deviates from the usable range, the comparator 44 determines the relay attack without the result of the comparative process.

The request signal S2 having lower strength is intermittently relayed by the relay device and the input state of the signal changes between at the gain determining time and at the strength measuring time. In such case, there is a possibility that the measurement value deviates from the usable range. In this case, by determining the relay attack, it is possible to improve the security of the keyless entry system in addition to the process in the embodiment. In addition, since it is possible to complete the process by determining the relay attack before executing the variation calculation and the comparative process, it is possible to reduce the process load in the portable device 3.

It should be noted that Modification 2 may be applied to Modification 1. That is, the relay attack determination device in Modification 2 may be provided with the overflow/underflow detector 56. The comparator 44 may determine the relay attack in a case where the overflow or the underflow of the amplifiers 51, 52 is detected or the measurement value deviates from the usable range.

[Modification 3]

In Modification 2, in a case where the input state of the request signal S2 changes between at the gain determining time and at the strength measuring time due to the intermittent relay, the measurement value deviates from the usable range. Therefore, the process for referring to the measurement value of the reception strength is executed before carrying out the variation calculation and the comparative process to add the determination of the relay attack.

In Modification 3, by changing the threshold value to be used at the comparative process in place of separately executing the reference process, the relay attack can be determined in the comparative process in a case where the measurement value deviates from the usable range.

Figure 17:
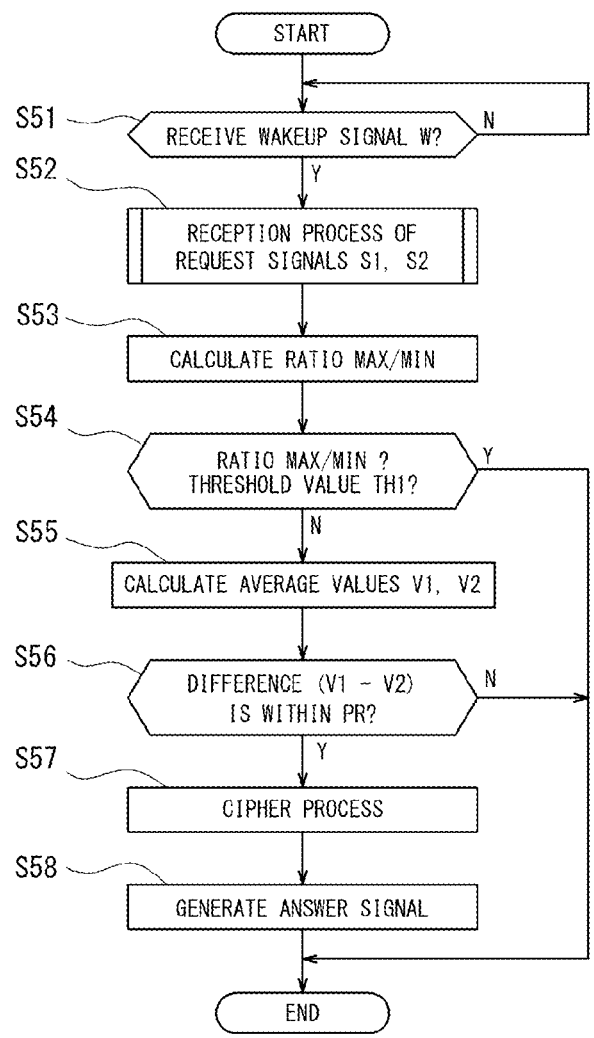
FIG. 17 is a flow chart showing a process of a portable device according to Modification 3.

FIG. 17 is a flow chart showing the process of the portable device 3 according to Modification 3.

The process of Modification 3 is the same process as the embodiment except for step S56, and therefore, an explanation of the other processes is omitted.

In Modification 3, as shown in FIG. 17 the comparator 44 determines whether or not a difference (V1−V2) in reception strength is within a predetermined numerical range PR as the comparative process (step S56).

The predetermined numerical range PR is a range in which a threshold value TH2 is set as the lower limit and a threshold value TH3 is set as the upper limit. The threshold value TH2 can be the same as the threshold value TH2 used in the embodiment, and the threshold value TH2 can be set as a value based upon a difference in output strength of the request signals S1, S2 upon transmitting the signals by the in-vehicle device 1, further, the error can be considered upon setting the value.

Threshold value TH3 is set based upon a difference in reception strength between the request signal S1 and the request signal S2, in a case where the reception strength of the request signal S2 deviates from the usable range and the measurement value thereof sticks to the upper limit or the lower limit.

Figure 18:
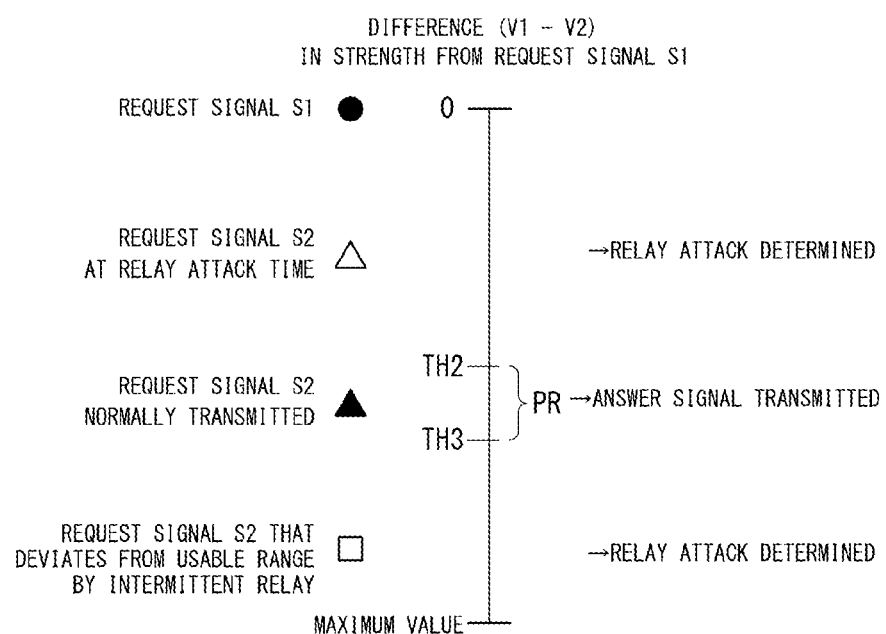
FIG. 18 is a flow chart explaining a process of Modification 3.

FIG. 18 is a diagram explaining the process of Modification 3.

FIG. 18 explains differences in reception strength between the request signal S2 transmitted in various cases and the request signal S1. FIG. 18 explains the process corresponding to the respective differences. In FIG. 18, the request signal S1 is indicated in a black circle. The request signal S2 relayed not intermittently at the relay attack time is indicated in an unshaded triangle. The request signal S2 normally transmitted from the in-vehicle device 1 to the portable device 3 is indicated in a black triangle. Further, the request signal S2 intermittently relayed at the relay attack time and sticking to the lower limit of the usable range of the measurement value is indicated in an unshaded square.

First, in a case where the request signal S2 is normally transmitted, a difference (V1−V2) in reception strength from the request signal S1 is larger than the threshold value TH2 determined corresponding to the difference in output strength. In a case where the request signal S2 is relayed not intermittently at the relay attack time, the difference (V1−V2) in reception strength of the request signal S1 from the request signal S2 becomes small via the same relay device and is positioned between 0 and the threshold value TH2. In this case, the comparator 44 determines the relay attack.

On the other hand, in a case where the request signal S2 is intermittently relayed by the relay attack and the measurement value of the reception strength deviates from the usable range, the difference (V1−V2) in reception strength becomes larger than in a case of being normally transmitted.

Therefore, in Modification 3 a threshold value TH3 is set to be larger than the threshold value TH2, and a predetermined numerical range PR is set in such a manner that the threshold value TH2 is set as the lower limit and the threshold value TH3 is set as the upper limit. The threshold value TH3 can be determined by preliminary tests or simulation. The comparator 44 generates the answer signal only in a case where the difference (V1−V2) in reception strength is within the predetermined numerical range PR and determines the relay attack in a case where the difference (V1−V2) in reception strength deviates from the predetermined numerical range PR.

Thereby, even in a case where the input state changes between at the gain determining time and at the strength measuring time by the intermittent relay of the relay attack, the relay attack can be determined in the comparative process to be executed by the comparator 44.

As described above, in Modification 3, (6) the comparator 44, as the comparative process, calculates the difference (V1−V2) between the average values V1, V2 of the reception strengths of the request signal S1 and the request signal S2 respectively and compares the difference (V1−V2) with the predetermined numerical range PR.

The comparator 44 determines the relay attack in a case where the difference (V1−V2) deviates from the predetermined numerical range PR.

The threshold value TH2 as the lower limit in the predetermined numerical range PR is determined based upon the difference in output strength between the request signal S1 and the request signal S2 upon transmitting the request signal S1 and the request signal S2 in the LF transmitter 13 of the in-vehicle device 1.

The threshold value TH3 as the upper limit in the predetermined numerical range PR is determined based upon the difference between the reception strength of the request signal S1 and the upper limit or the lower limit of the usable range.

In Modification 3, without adding the process or components, the determination accuracy of the relay attack can be enhanced by setting the predetermined numerical range PR in the comparative process to further improve the security.

It should be noted that in the above-mentioned example, the difference (V1−V2) in reception strength between the request signal S1 and the request signal S2 is directly used, but since the ratio V1/V2 of the reception strength also indicates the difference in reception strength of two signals, the ratio V1/V2 may be used.

[Other Modifications]

In the above-mentioned embodiment, there is explained the example in which the process corresponding to the determination of the relay attack is executed by the portable device 3, but not limited thereto, the determination of the relay attack may also be made by the in-vehicle device 1.

For example, the portable device 3 may perform only the measurement of the reception strength in each of the request signals S1, S2 and transmit the measurement value to the in-vehicle device 1 with being included in the answer signal. The in-vehicle device 1 may determine the relay attack by executing the variation calculation, the average-value calculation, the comparative process and the like based upon the received measurement value and control the operation of the in-vehicle equipment of the door lock or the like corresponding to the determination result.

Alternatively the portable device 3 may execute the process to the variation calculation or the average-value calculation. The portable device 3 may transmit the data of the calculation and the like including the answer signal to the in-vehicle device 1, and the in-vehicle device 1 may execute the comparative process to perform determination of a final relay attack. That is, the functional arrangement of the comparator 44, the determiner and the variation calculator 42 may be realized in any of the CPU 11 in the in-vehicle device 1 and the CPU 35 in the portable device 3.

The in-vehicle device 1 may complete the process without releasing the door lock in a case where the relay attack is determined. In addition, a warning device such as a buzzer or a lamp may be disposed in the in-vehicle device 1, and in a case where the relay attack is determined, a warning may be outputted from this device.

In the above-mentioned embodiment, there is explained the example in which the request signals S1, S2 output strengths of which are made different are transmitted from the single transmission antenna 7 of the in-vehicle device 1 and the relay attack is determined by comparing the reception strengths of the respective signals received on the portable device 3-side. However, it is only required to transmit the plurality of the request signals having different output conditions enable for determining the relay attack. The transmission aspect of the request signal S can be modified as needed.

"Output conditions are made different" includes, for example, output strengths are made different in the same way as the embodiment, and besides, "output directions are made different", "output positions are made different" and "output timings are made different" as well.

In a case where "output directions are made different", the request signals S1, S2 may be transmitted from the transmission antenna 7 with orientations of magnetic fields of the request signals S1, S2 being made different. In a case where "output positions are made different", two transmission antennas may be arranged in the different positions of the vehicle V and the request signals S1, S2 may be transmitted from the two transmission antennas respectively. The reception strength on the portable device 3-side differs between the two signals also by making the output directions or the output positions different, thus the determination of the relay attack can be made by executing the comparative process of the reception strength.

It should be noted that which of the request signal S1 and the request signal S2 is lowered in reception strength on the portable device 3-side is not determined in these aspects. Therefore, the variation calculator 42 may calculate variation of both of the request signal S1 and the request signal S2. Alternatively, the variation calculator 42 may refer to the reception strength of each of the request signal S1 and the request signal S2, select the request signal S having lower reception strength to calculate the variation. In this case, the variation calculator 42 may refer to the maximum value MAX or the minimum value MIN of the reception strength, or may be refer to a central value thereof.

In addition, the transmission number of times of the request signal S is not limited to twice, but the request signal S may be transmitted by three or more times. Further, the request signal S may be successively outputted while differing the strength thereof or changing the orientation of the magnetic field on the way of transmission.

In recent years, as one aspect of a relay attack, a relay device is swayed so as to make output directions of the request signals S made different from each other, thereby changing a reception strength ratio in the portable device 3. As a further measure against such an aspect, after transmitting request signals S1, S2 from the transmission antennas 7a, 7b in the in-vehicle device 1 respectively, a request signal S3 having the same strength as the request signal S1 may be further outputted from the transmission antenna 7a. That is, the request signal S is transmitted so as to "make the output timing different".

In a case where the request signal S is appropriately received in the portable device 3, the strength ratio of the request signal S1 is made different from the strength ratio of the request signal S2, and the strength ratio of the request signal S1 is the same as the strength ratio of the request signal S3. On the other hand, in a case where the request signals S1, S2, S3 are relayed by swinging the relay device, since all the strength ratios of the request signals S1, S2, S3 are different, it is possible to determine the relay attack.

In addition, the reception antenna 32 of the portable device 3 may be composed of an antenna having a plurality of axes oriented in different directions, for example, a three-axis antenna, and the reception strength may be measured in each axis.

Further, the comparative process for determining the relay attack is not limited to the comparative process of the reception strength described above, but may be executed along with other comparative processes. For example, in a case of using a three-axis antenna as the reception antenna 32, a strength ratio indicating an orientation of vector of the request signal S may be calculated from the reception strength of each axis and the comparative process of them may be executed.

In a case of using the three-axis antenna, the variation in reception strength may be calculated in each axis. When the variation is large in any of axes, it may be determined as the communication failure. In this case, when the variation is large even in one axis, a possibility of the relay attack may be determined to complete the process.

Alternatively, the axis having large variation is determined as an ineffective axis and may be excluded, and the strength ratio may be calculated by the effective axes only. In this case, when the number of the effective axes falls below the number as large as to be capable of calculating the strength ratio, a possibility of the relay attack may be determined to complete the process.

In the comparative process using the above-mentioned threshold values TH1, TH2, the comparative target is "a threshold value or more", or "less than a threshold value" is used as a reference, but either the comparative target is "greater than a threshold value" or "a threshold value or less" may be used as a reference in response to the setting of the threshold value TH1 or TH2. That is, it is not necessary for "a threshold value or more" or "less than a threshold value" to be strictly applied, which includes both of a case of not including a value as the threshold value and a case of including the value as the threshold value.

REFERENCE SIGNS LIST

1: IN-VEHICLE DEVICE
3: PORTABLE DEVICE 5, 5a, 5b, 5c: REQUEST SWITCH
7: TRANSMISSION ANTENNA
8: RECEPTION ANTENNA
9: DOOR LOCK ACTUATOR
10: KEYLESS CONTROLLER
11: CPU
12: MEMORY
13: LF TRANSMITTER
14: RF RECEIVER
15: ACTUATOR DRIVE CIRCUIT
20: CONTROL UNIT
21: SWITCH DETERMINER
22: SIGNAL GENERATOR
23: CIPHER PROCESSOR
30: REMOTE CONTROLLER
32: RECEPTION ANTENNA
33: TRANSMISSION ANTENNA
35: CPU
36: MEMORY
37: LF RECEIVER
38: STRENGTH METER
39: RF TRANSMITTER
41: GAIN DETERMINER
42: VARIATION CALCULATOR
43: AVERAGE-VALUE CALCULATOR
44: COMPARATOR
45: CIPHER PROCESSOR
46: SIGNAL GENERATOR
51, 52: AMPLIFIER
53: GAIN ADJUSTER
54: PEAK DETECTOR
55: A/D CONVERTER
56: OVERFLOW/UNDERFLOW DETECTOR
V: VEHICLE
S, S1, S2: REQUEST SIGNAL

The invention claimed is:

1. A relay attack determination device for determining a relay attack, in which wireless communications between an in-vehicle device and a portable device are relayed by a relay device, comprising:
a transmitter disposed on an in-vehicle device, the transmitter being configured to transmit a first signal and a second signal having an output condition different from the first signal;
a receiver disposed on the portable device to receive the first signal and the second signal;
a strength meter disposed on the portable device to measure a reception strength by a plurality of times in each of the first signal and the second signal received by the receiver;
a comparator configured to execute a comparative process of the first signal and the second signal by using an average value of the reception strengths measured by the strength meter;
a determiner configured to determine the relay attack based upon a result of the comparative process; and
a variation calculator configured to calculate variation in the reception strength measured by the plurality of times in the strength meter regarding a signal having lower reception strength between the first signal and the second signal, wherein
in a case where the variation in the reception strength exceeds a threshold value indicating a communication failure, the determiner determines the relay attack regardless of the result of the comparative process.

2. The relay attack determination device according to claim 1, wherein
the transmitter transmits the second signal having an output strength made lower than the first signal, and
the variation calculator calculates variation in the reception strength of the second signal.

3. The relay attack determination device according to claim 2, wherein
the variation calculator calculates a difference between a maximum value and a minimum value of the reception strengths measured by a plurality of times in the strength meter as the variation in the reception strength.

4. The relay attack determination device according to claim 2, further comprising:
a peak detector configured to detect a maximum amplitude of the first signal and the second signal;
a gain determiner configured to determine a gain of each of the first signal and the second signal based upon the maximum amplitude; and
an amplifier configured to amplify the first signal and the second signal by the gain determined in the gain determiner, wherein
the strength meter measures a reception strength of each of the first signal and the second signal amplified in the amplifier.

5. The relay attack determination device according to claim 4, further comprising:
a detector configured to detect overflow or underflow of output of the amplifier, wherein
in a case where the detector detects the overflow or the underflow of the output of the amplifier upon measuring the reception strength of the second signal, the determiner determines the relay attack regardless of the result of the comparative process.

6. The relay attack determination device according to claim 4, wherein
in a case where a measurement value of the reception strength of the second signal measured in the strength meter deviates from a usable range, the determiner determines the relay attack regardless of the result of the comparative process.

7. The relay attack determination device according to claim 4, wherein
the comparator, as the comparative process, calculates a difference between respective average values of the reception strength of the first signal and the second signal and compares the difference with a predetermined numerical range,
the determiner determines the relay attack in a case where the difference deviates from the predetermined numerical range,
a lower limit of the predetermined numerical range is determined based upon a difference in output strength between the first signal and the second signal upon transmitting the first signal and the second signal in the transmitter, and
an upper limit of the predetermined numerical range is determined based upon a difference between the reception strength of the first signal and an upper limit or a lower limit of a usable range of the measurement value in the strength meter.

* * * * *